(12) United States Patent
Davis et al.

(10) Patent No.: US 7,076,728 B2
(45) Date of Patent: Jul. 11, 2006

(54) METHOD AND APPARATUS FOR END-TO-END CONTENT PUBLISHING SYSTEM USING XML WITH AN OBJECT DEPENDENCY GRAPH

(75) Inventors: Peter E. Davis, Fairfield, CT (US); Sara Elo Dean, New York, NY (US); Dikran S. Meliksetian, Danbury, CT (US); Jeffrey Milton, New York, NY (US); Louis Weitzman, Brookline, MA (US); Nianjun Zhou, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 09/747,871

(22) Filed: Dec. 22, 2000

(65) Prior Publication Data

US 2002/0133516 A1    Sep. 19, 2002

(51) Int. Cl.
*G06F 15/00* (2006.01)
(52) U.S. Cl. .................. 715/513; 715/501.1; 715/511; 715/523; 709/224; 709/220
(58) Field of Classification Search .............. 715/513, 715/501.1, 500, 511, 514, 516, 523; 709/220, 709/224
See application file for complete search history.

(56) References Cited

U.S. PATENT DOCUMENTS

| | | | |
|---|---|---|---|
| 5,553,216 A * | 9/1996 | Yoshioka et al. | 715/515 |
| 5,727,156 A | 3/1998 | Herr-Hoyman et al. | |
| 5,855,015 A * | 12/1998 | Shoham | 707/5 |
| 5,860,073 A | 1/1999 | Ferrel et al. | |
| 6,021,435 A * | 2/2000 | Nielsen | 709/224 |
| 6,023,714 A | 2/2000 | Hill et al. | |
| 6,049,799 A * | 4/2000 | Mangat et al. | 707/10 |
| 6,055,522 A | 4/2000 | Krishna et al. | |
| 6,073,135 A * | 6/2000 | Broder et al. | 707/100 |
| 6,108,698 A * | 8/2000 | Tenev et al. | 709/220 |
| 6,321,242 B1 * | 11/2001 | Fogg et al. | 715/513 |

(Continued)

OTHER PUBLICATIONS

Hakon Wium Lie et al., "Multipurpose Web Publishing Using HTML, XML and CSS", Communications of the ACM, Oct. 1999, vol. 42, No. 10, pp. 95-101.

(Continued)

*Primary Examiner*—Stephen Hong
*Assistant Examiner*—Thu V. Huynh
(74) *Attorney, Agent, or Firm*—Jon A. Gibbons; Fleit, Kain, Gibbons, Gutman, Bongini & Bianco P.L.

(57) ABSTRACT

The system for end-to-end content publishing using XML with an object dependency graph is based on the following two design principles: First, separation of content and style: Information stored in the content management system is independent on how it is going to be presented. The presentation style is encapsulated elsewhere and can be used to customize the look and feel based on the end-user preferences as well as the delivery methods and devices. Second, reusability of information content: By encapsulating common information in fragments and subfragments and making these fragments insertable in other fragments, thereby avoid scattering and duplication of information. This enables a user to restrict the edit operations to a limited number of relevant fragments, to affect global changes. In addition, the present invention provides data consistency and data integrity in the content management.

24 Claims, 12 Drawing Sheets

U.S. PATENT DOCUMENTS

| | | | |
|---|---|---|---|
| 6,509,898 B1 * | 1/2003 | Chi et al. | 345/440 |
| 6,578,000 B1 * | 6/2003 | Dodrill et al. | 704/270 |
| 6,732,331 B1 * | 5/2004 | Alexander | 715/513 |
| 2001/0044811 A1 * | 11/2001 | Ballantyne et al. | 707/513 |
| 2002/0010711 A1 * | 1/2002 | Nakanishi et al. | 707/501.1 |
| 2002/0023113 A1 * | 2/2002 | Hsing et al. | 707/513 |
| 2002/0026461 A1 * | 2/2002 | Kutay et al. | 707/523 |
| 2002/0099738 A1 * | 7/2002 | Grant | 707/513 |
| 2002/0143821 A1 * | 10/2002 | Jakubowski | 707/522 |
| 2004/0205528 A1 * | 10/2004 | Alexander | 715/505 |
| 2004/0210556 A1 * | 10/2004 | Brooke et al. | 707/1 |

OTHER PUBLICATIONS http://www.w3.org, World Wide Web Consortium, "Canonical XML Becomes a W3C Proposed Recommendation," Jan. 29, 2001

* cited by examiner

METHOD AND APPARATUS FOR END-TO-END CONTENT PUBLISHING SYSTEM USING XML WITH AN OBJECT DEPENDENCY GRAPH

CROSS-REFERENCE TO RELATED APPLICATIONS

Not Applicable.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

The present invention relates to the field of computerized publication of documents, and more particularly to a method for publishing documents using XML on networks such as the Word Wide Web and the ability to publish documents for different device types such as computers, PDAs, cell phones and print.

2. Description of the Related Art

Web sites often present content which is constantly changing. Presenting current information to the outside world without requiring an inordinate amount of human effort and computing power is a major technical challenge to Web site designers.

Multimedia content including text, graphics, video and sound on the Internet needs to be highly adaptive. Recently the World Wide Web Consortium (W3C) adopted the Extensible Markup Language (XML) as a universal format for structured documents and data on the Web. The base specifications are XML 1.0, W3C Recommendation February '98. See online URL (www.w3.org) for more information. A content management system based on XML along with (Extensible Stylesheet Language) XSL enforces separation of content and presentation, thus allowing flexible rendering of the content to multiple device types. Similarly, such a content management system allows maximal reuse of information and data through the composition of XML fragments as well as ensures data integrity through the consistent use of information.

In addition to the availability of XML, new interfaces and devices are emerging, the diversity of users is increasing, machines are acting more and more on users' behalf, and net activities are possible for a wide range of business, leisure, education, and research activities.

Systems and methods are being developed for generating more flexible content and a capability to manage frequent changes to content. One system for achieving maximum flexibility and reuse is disclosed in the patent application entitled "Method and System for Efficiently Constructing And Consistently Publishing Web Documents" filed on Apr. 4, 1999 with application Ser. No. 09/283,542 with inventors JR Challenger et al. now [Pending] and commonly assigned herewith to International Business Machines. Disclosed is a system and method where the multimedia content is broken down into fragments that can be combined into published documents.

The use of XML in content management systems introduces the following new challenges:

1. A need exists to maintain information about the functional and semantic role of each richly tagged fragment. This information describes what the content is about, who the target audience is, and its relationship to a taxonomy or other fragments. The same mechanism should support efficient searches of particular fragments.
2. A need exists for an efficient method to track the effects of changes in a particular richly tagged fragment or style and propagate those changes throughout the information space.
3. A need exists for a user interface that shields the content contributor from knowing the underlying syntax and complexities of the XML documents;
4. A need exists for finding relevant document fragments on demand, keeping track of the dependencies between document fragments, transforming combinations of those document fragments into viewable pages available to multiple device types, and designing a content creation tool that does not overwhelm the contributor with the details and the complexities of the underlying system.

Accordingly, a need exists for a system and method that manages and publishes the information content of a Web site, or an Internet information portal, in a way that separates the information from the form and reuses the stored information and enables the presentation in the user interface to be customized for different audiences and target devices and media.

Other prior art systems/tools that relate to the XML editing include markup languages that use XML to declaratively specify user interfaces, fully functioning editors, and systems that publish XML documents. Bluestone Software's XwingML [for more information refer to URL www.bluestone.com] enables the creation of Java Swing user interfaces without coding. The GUI (Graphical User Interface) is declaratively specified in XML and is translated into working Java code. This approach separates the GUI code from the application logic. Their DTD specifies the entire set of classes and properties for all of Swing components. However, the Bluestone Software's XwingML creates arbitrary interfaces in a declarative fashion rather than creating specific interfaces that reflect the document types for a given publishing environment. Accordingly a need exists for a method and tool to accomplish creating specific interfaces that reflect the document types for a given publishing environment.

Another prior art editor for XML is XmetaL, from Softquad, [refer to online URL www.xmetal.com] which is a flexible XML editor that supports three views into XML files. These views include raw XML mode, Tags-On mode that provides a WYSIWYG presentation with direct access to elements and attributes, and a full WYSIWYG mode in a word-processor like environment. The XmetaL tool although useful has the problem that separate style sheets need to be used to support the editing vs. the publishing process. In addition, one stylesheet may not include all of the elements that would be used on other platforms or for different uses. Accordingly, a content editor is needed that separates the content from presentation and the reusability of that content on different delivery environments such as PCs, PDAs and phones.

Still another prior art content editor system is Interwoven [refer to online URL www.interwoven.com] which is a complete publishing system that supports HTML as well as XML. It provides an end to end solution from content creation to promotion and publishing. It also has a templating tool that provides the means to produce form-based pages. However, its support of reusable fragments within the environment is rather limited and the publishing to viewable pages is performed using non-standard methods.

Accordingly a need exists for a method and tool to accomplish creating and reusing content fragments using standard methods for a given publishing environment.

SUMMARY OF THE INVENTION

The system for end-to-end content publishing using XML with an object dependency graph is based on the following two design principles: First, separation of content and style: Information stored in the content management system is independent on how it is going to be presented. The presentation style is encapsulated elsewhere and can be used to customize the look and feel based on the end-user preferences as well as the delivery methods and devices. Second, reusability of information content: By encapsulating common information in fragments and subfragments and making these fragments insertable in other fragments, thereby avoid scattering and duplication of information. This enables a user to restrict the edit operations to a limited number of relevant fragments, to affect global changes. In addition, the present invention provides data consistency and data integrity in the content management.

The implementation of the system is based on the following:

1. Standards based design: The different components of the system interact through well-defined API's based on industry standards, such as: XML, XSL, WebDAV, HTTP, DASL.
2. Pervasive use of XML: XML is used not only as the content model but also as the language in which information is transferred between the different parts of the system.

BRIEF DESCRIPTION OF THE DRAWING(S)

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

Figure 8:
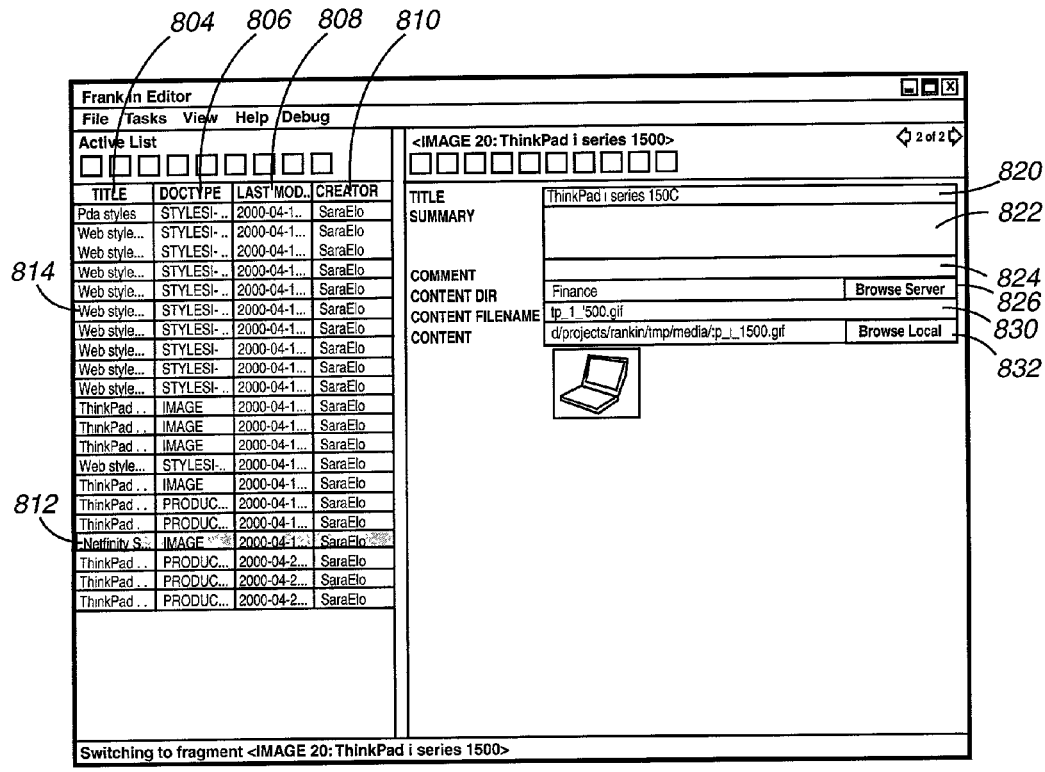

FIG. 8, shown is a GUI to enable the creation/modification of multimedia content, according to the present invention.

Figure 9:
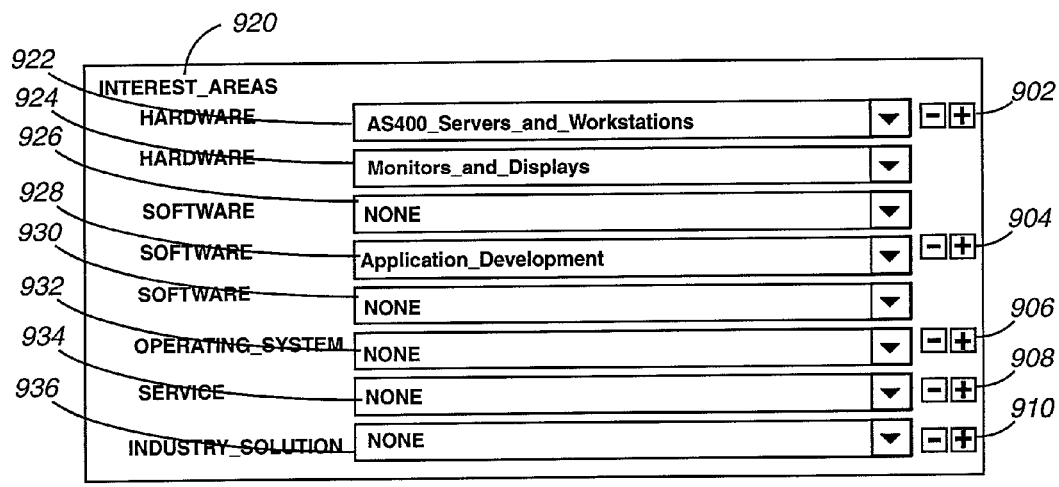

FIG. 9 is a GUI illustrating how elements presented can be replicated, according to the present invention.

Figure 5:
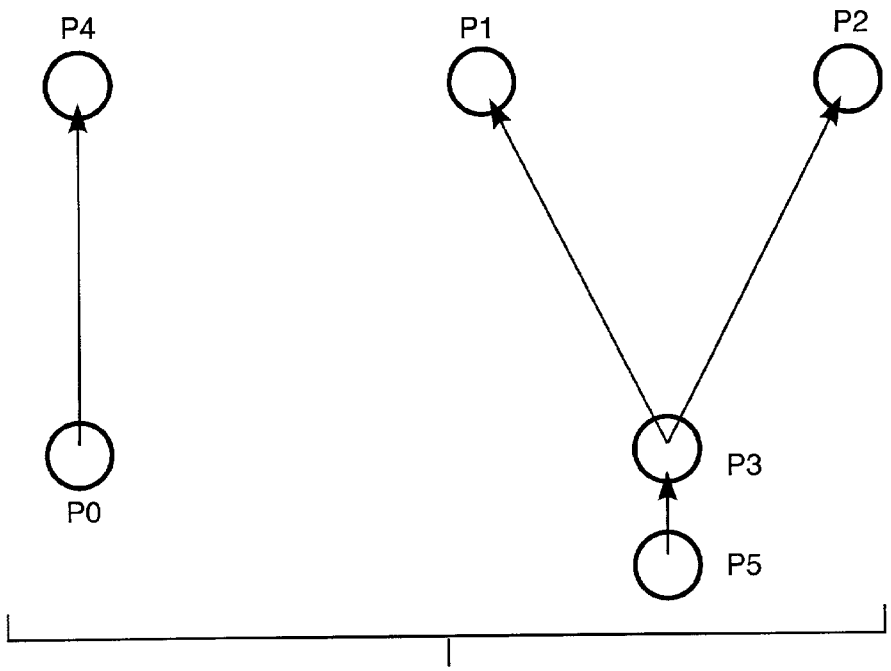
FIG. 5 is an object dependence graph (ODG) corresponding according to FIG. 4, in accordance with the present invention.
Figure 10:
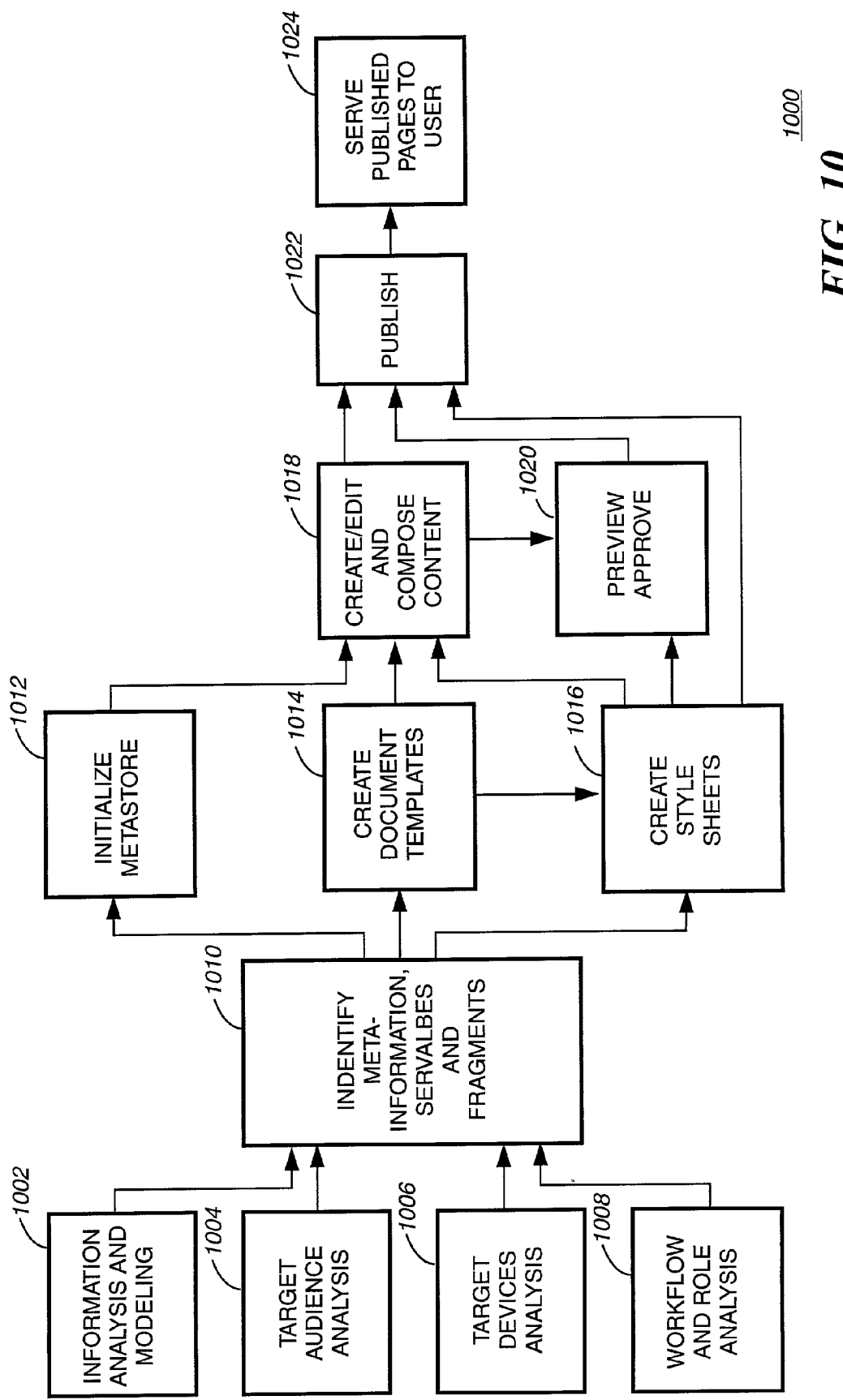

FIG. 10 is a functional block diagram of the overall process of the publishing system using XML with an object dependency graph of FIG. 5, according to the present invention.

Figure 11:
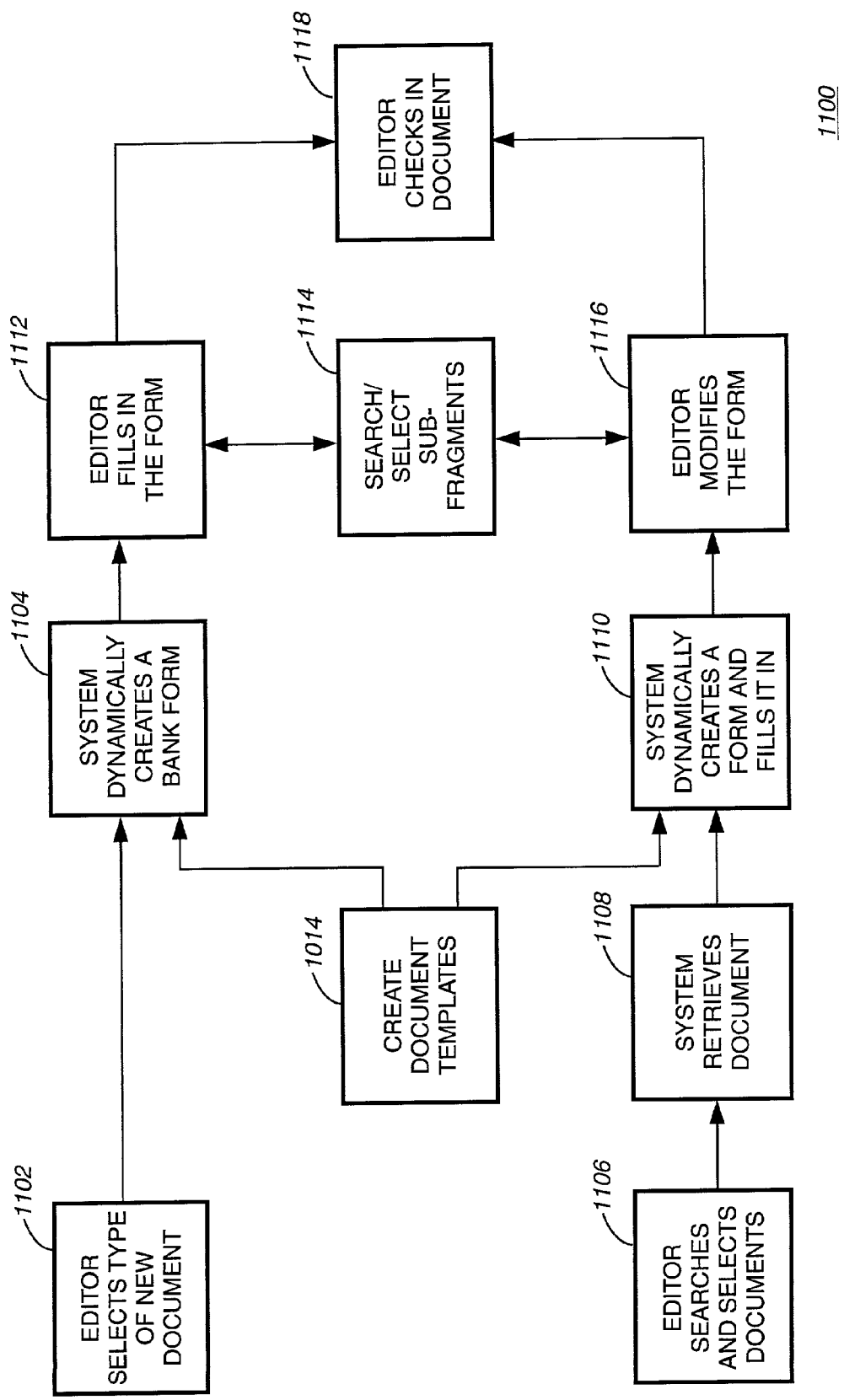

FIG. 11 is a functional block diagram of the create document template process of FIG. 10, according to the present invention.

Figure 12:
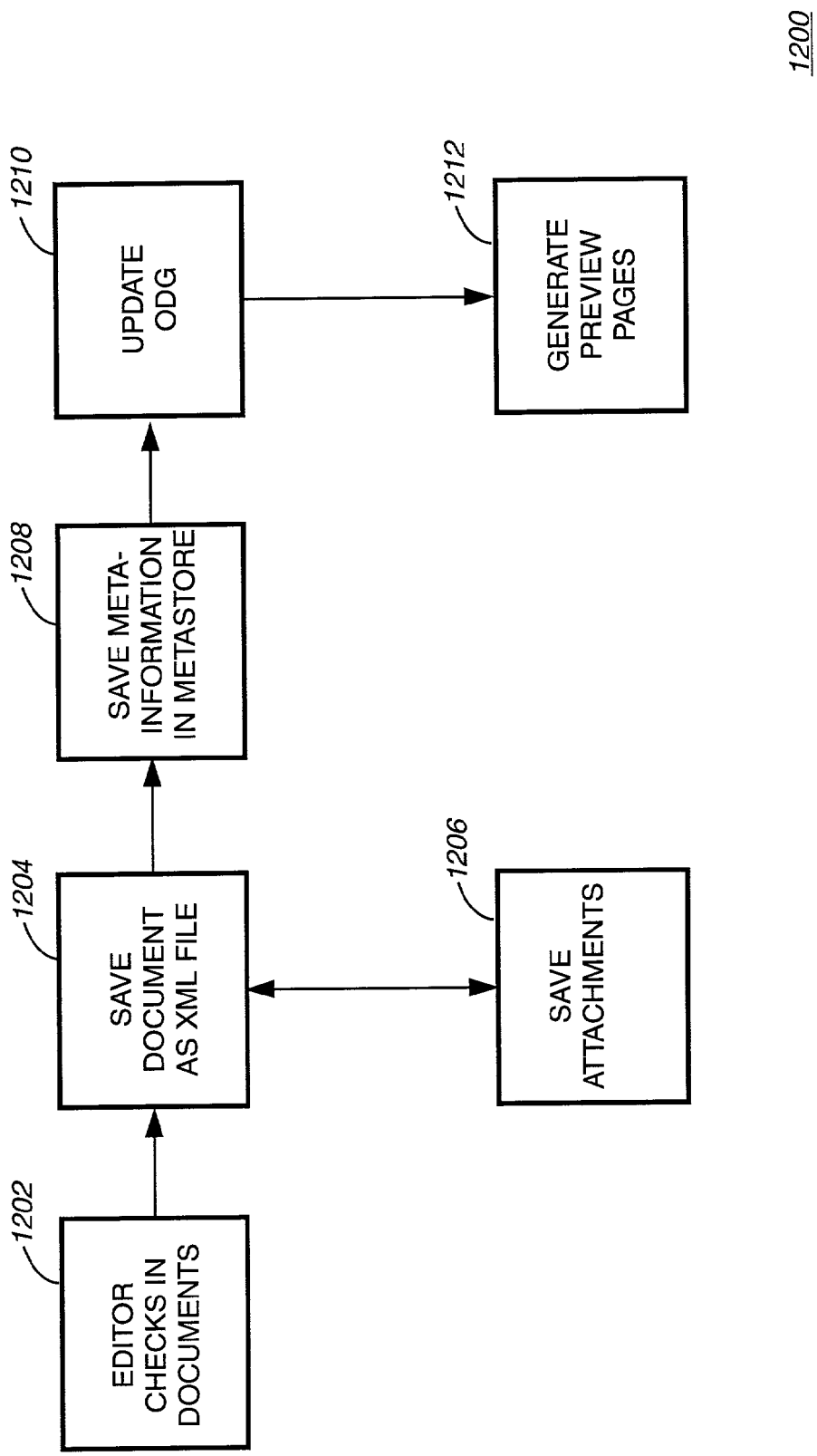

FIG. 12 is a functional block diagram of the checks in document process of FIG. 10, according to the present invention.

Figure 13A:
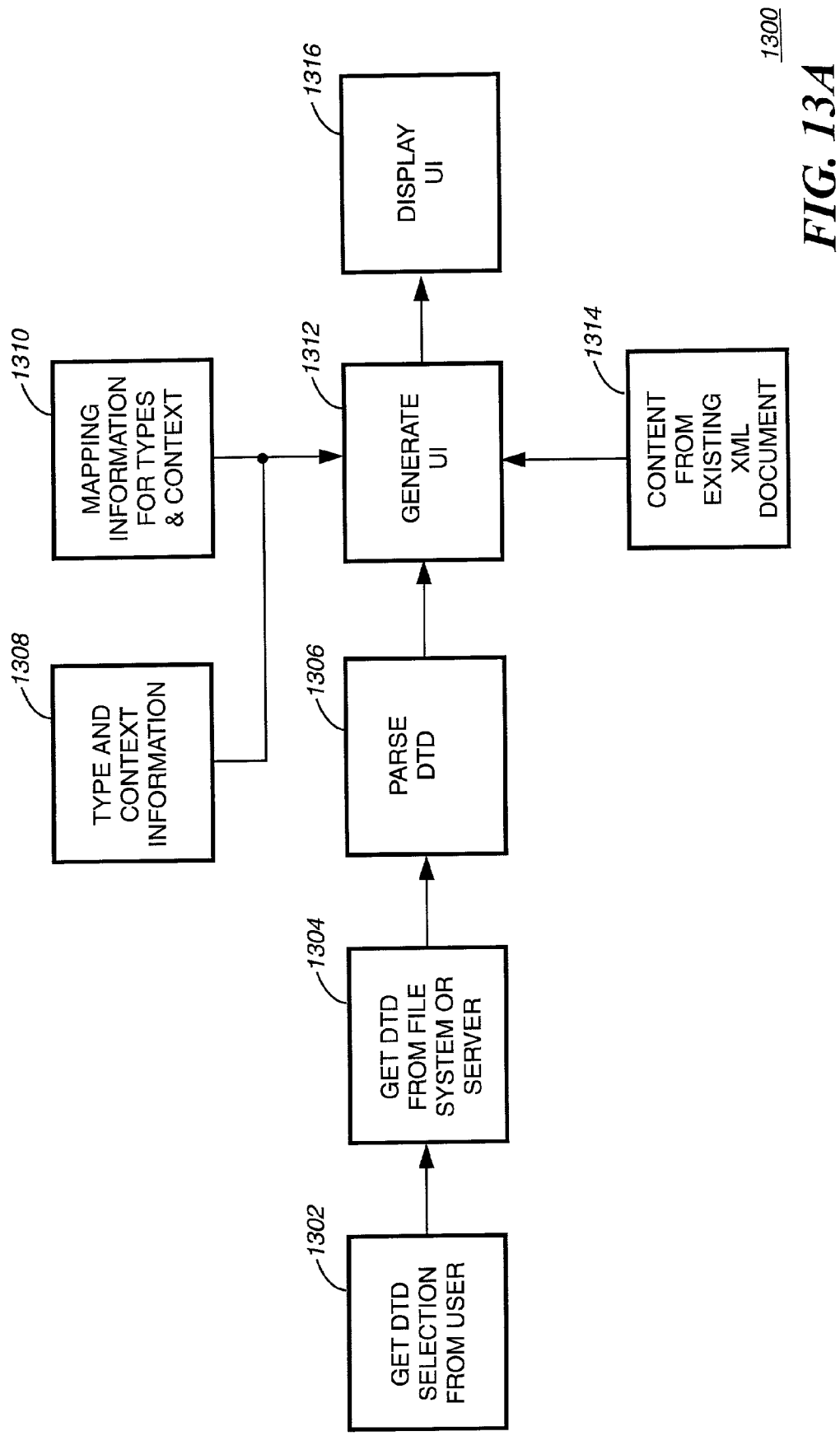

FIG. 13A is a process flow for the client editor GUI that builds the GUI interfaces as shown in FIGS. 8 and 9 used in the overall process flow of FIG. 10, according to the present invention.

Figure 13B:
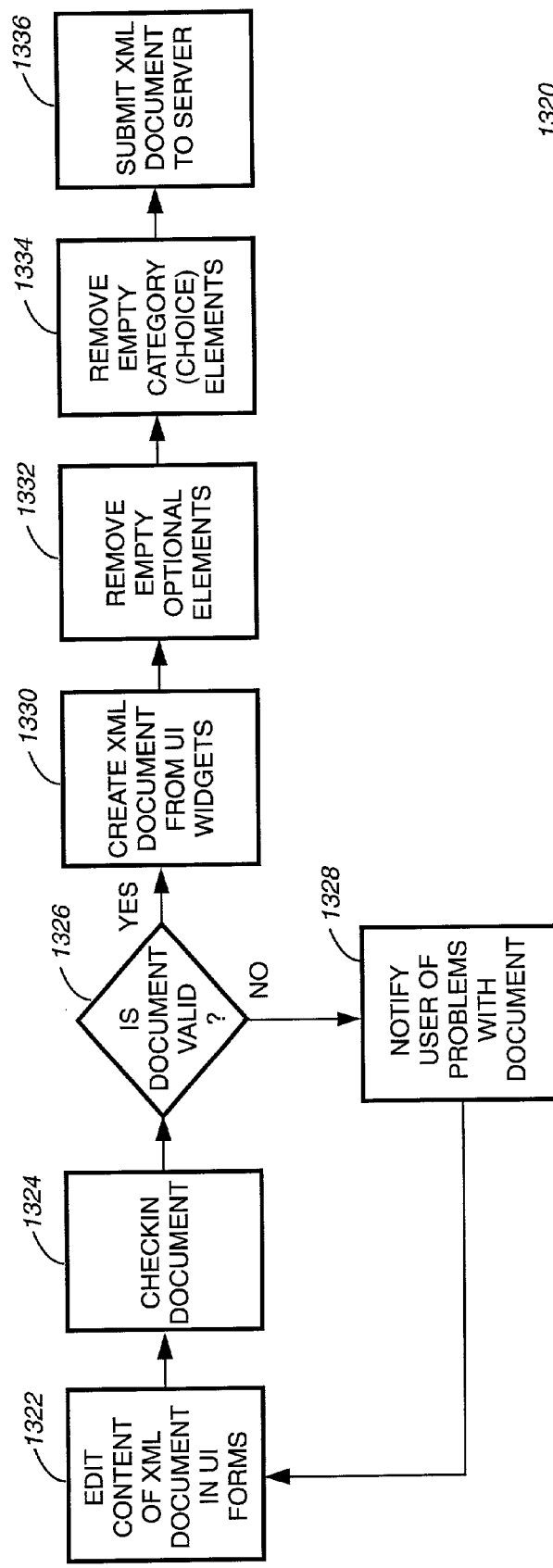

FIG. 13B is a process flow for the client editor GUI that checks-in the document after being constructed into the process flow of FIG. 12, according to the present invention.

DESCRIPTION OF A PREFERRED EMBODIMENT(S)

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

In the drawing like numerals refer to like parts through several views.

Exemplary Network—100

Figure 1:
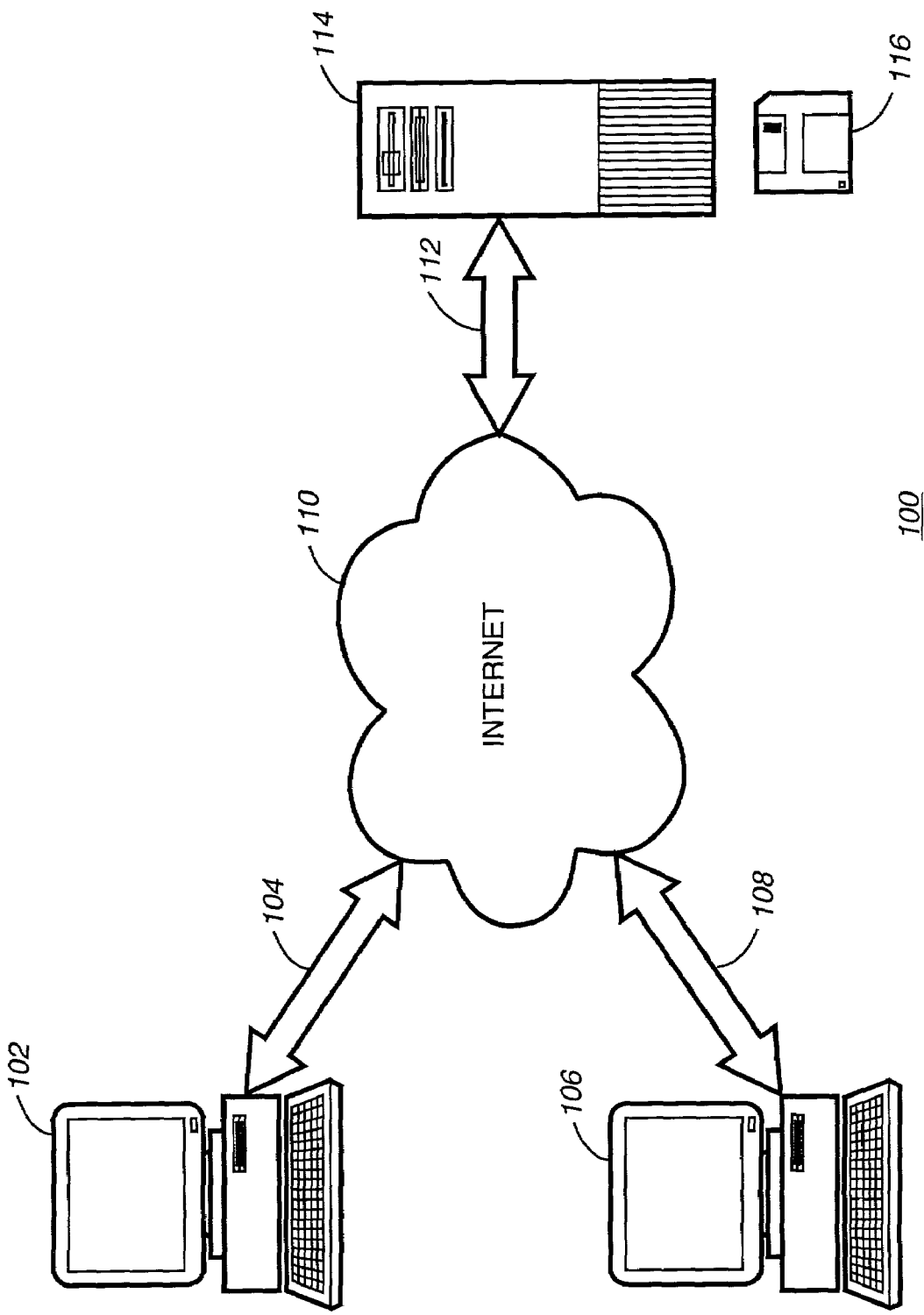
FIG. 1 is a schematic of a computer system used in practicing an embodiment the invention.

Referring to FIG. 1, a schematic of a computer system 100 used in connection with an embodiment of the present invention is depicted. One or more client editor computers 102 and 106 or information processing systems are connected to a network, Intranet or Internet 110 through bidirectional data links 104 and 108. A server 114, which operates according to the teachings of the invention as described hereinafter is connected to the Internet 110 through a third bidirectional data link 112. Bidirectional data links 104, 108, and 112 can for example comprise dial up modem connection, Digital Subscriber Lines (DSL), T1 Lines, direct connections and other Local Area Network (LAN) segments. The client editor computers 102 and 106 and the server can for example be IBM PC compatible computers. The present invention can be embodied in a removable computer readable medium drive such as a floppy diskette, CD, DVD or equivalent. The client computers 102, 106 can be loaded with Web browser software such as Netscape Navigator, by America Online of Dulles, Va. or Internet Explorer, by Microsoft of Redmond, Wash. The Web browser software can serve as a user interface through which information is read-in from an information providing user and a problem posing user, and through which information is output to the aforementioned users.

A removable computer readable memory medium in the form of a diskette 116 is provided for loading software onto the knowledge repository server 114. The software that configures the repository server and carries out processes according to the present invention which will be described below with reference to flow diagrams shown in the FIGS.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Overview of Trigger Monitor

This invention presents a system and method for publishing documents, for example Web documents, efficiently and consistently. This method may be used at a wide variety of Web sites of the World Wide Web. The present invention may be applied to systems outside the Web as well, for example, where compound objects are constructed from fragments. A fragment is an object which is used to construct a compound object. The term "document fragment" or just "fragment" is used throughout this patent to refer to these reusable information objects. Which in their simplest form are an XML fragments. An object is an entity which can either be published or is used to create something which is publishable. Objects include both fragments and compound objects. A compound object is an object constructed from one or more fragments.

In generating Web content, publishable Web pages known as servables may be constructed from simpler fragments. A servable is a complete entity which may be published at a Web site. Publishing an object means making it visible to the public or a community of users. Publishing is decoupled from creating or updating an object and generally takes place after the object has been created or updated. It is possible for a servable to embed a fragment which in turn embeds another fragment, etc.

While fragments significantly increase the capabilities of a Web site, a number of problems may arise which need to be solved, including the following:

(1) When changes to underlying data occur, how does the system determine all objects affected by the change?

(2) How does the system determine a correct and efficient order for updating fragments and servables?

(3) How can a system consistently publish Web pages in the presence of fragments?

Figure 2:
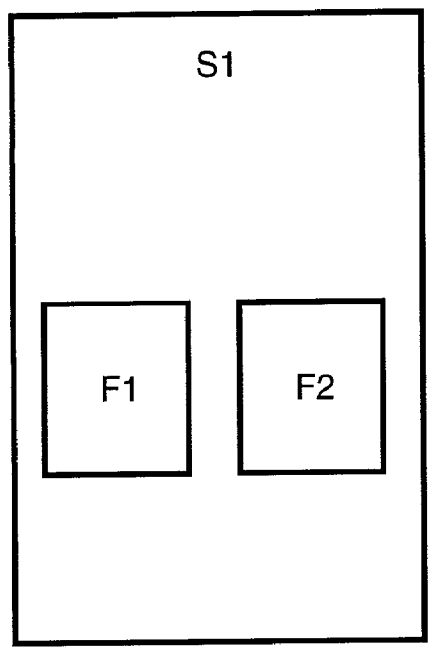
FIG. 2 is a block diagram showing relationships among a set of fragments and compound objects.
Figure 2:
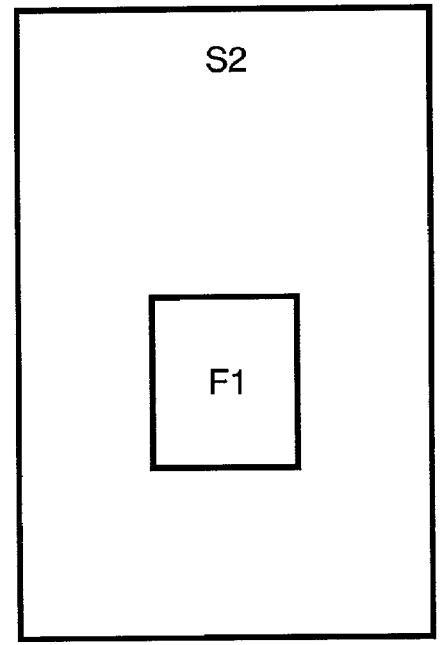
Figure 2:
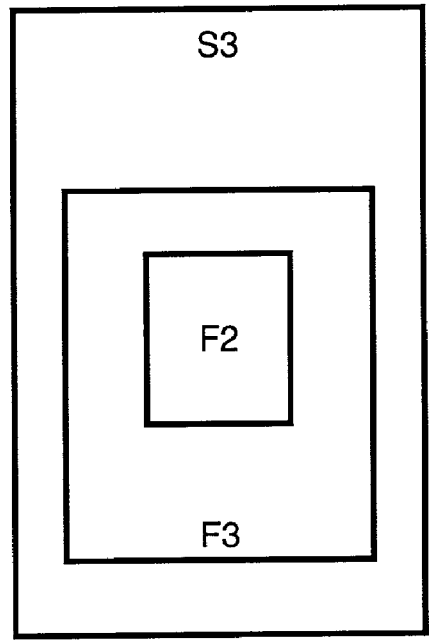

For an illustrative example, refer to FIG. 2. Suppose that servables S1 and S2 both embed the same fragment f1. If f1 changes, updated versions of S1 and S2 must be published concurrently; otherwise, the site will look inconsistent. However, the consistency problem is worse than just determining if a set of pages all embed the same fragment. For example, suppose S1 and S3 both embed fragment f2. If f2 changes, updated versions of both S1 and S3 must be published concurrently. However, if both f1 and f2 change, updated versions of S1, S2, and S3 must be published concurrently, even though S2 and S3 might not embed a common fragment.

A method for solving problem (1) is described in a commonly assigned patent application, U.S. Ser. No. 08/905,114, entitled "Determining How Changes to Underlying Data Affect Cached Objects" by J. Challenger, P. Dantzig, A. lyengar, and G. Spivak. The current invention solves problems (2) and (3).

Figure 3:
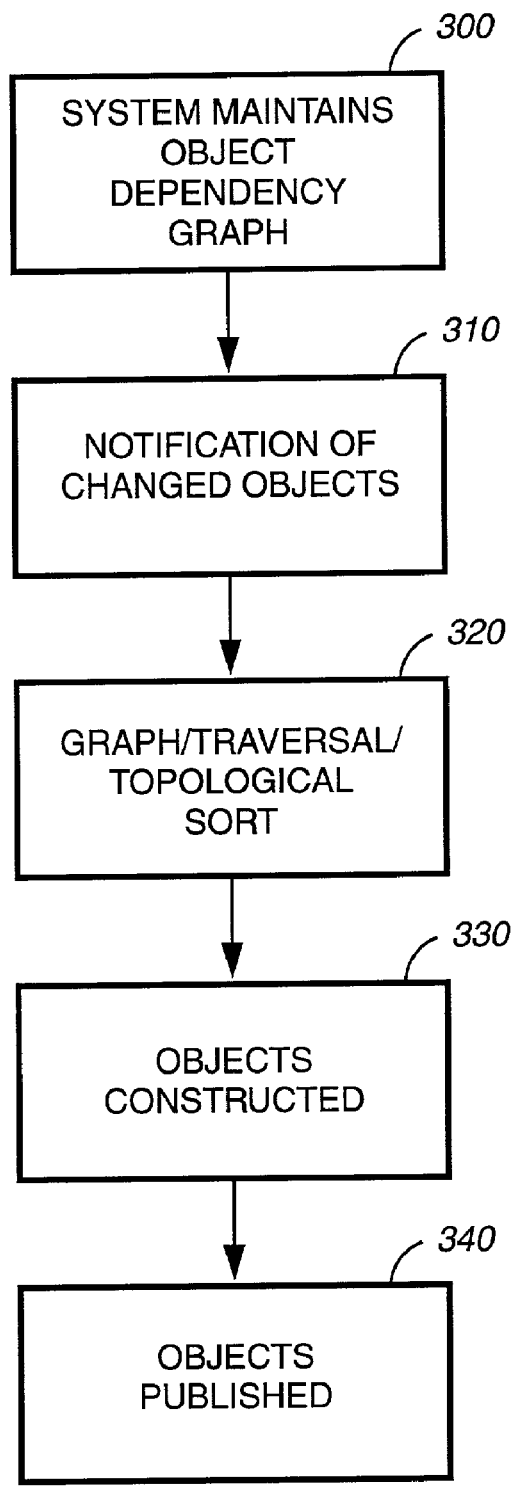
FIG. 3 is a block/flow diagram of a system/method for efficiently constructing and publishing objects in accordance with the present invention.
Figure 6:
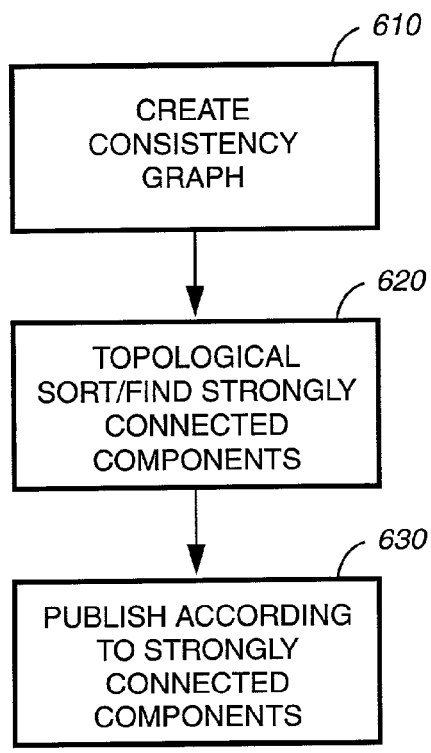
FIG. 6 is a flow diagram for a method for consistently publishing objects in accordance with the present invention.

It should be understood that the elements shown in FIGS. 3 and 6 may be implemented in various forms of hardware, software or combinations thereof unless otherwise specified. Preferably, these elements are implemented in software on one or more appropriately programmed general purpose digital computers having a processor and memory and input/output interfaces. Referring now to the drawings in which like numerals represent the same or similar elements and initially to FIG. 3, a block/flow diagram of a system/method for efficiently constructing and publishing one or more servables in accordance with the present invention is shown. In block 300, the system maintains an object dependence graph (ODG) which is a directed graph with objects corresponding to nodes/vertices in the graph. A dependence edge from a to b, for example, indicates that a change to object a also affects object b. The edge also implies that a should be updated before b after a change which affects the values of both a and b occurs.

Dependence edges may preferably be used to identify the following:

a. The objects affected by a change to underlying data.
b. The order in which objects are desired or needed to be updated.

Figure 4:
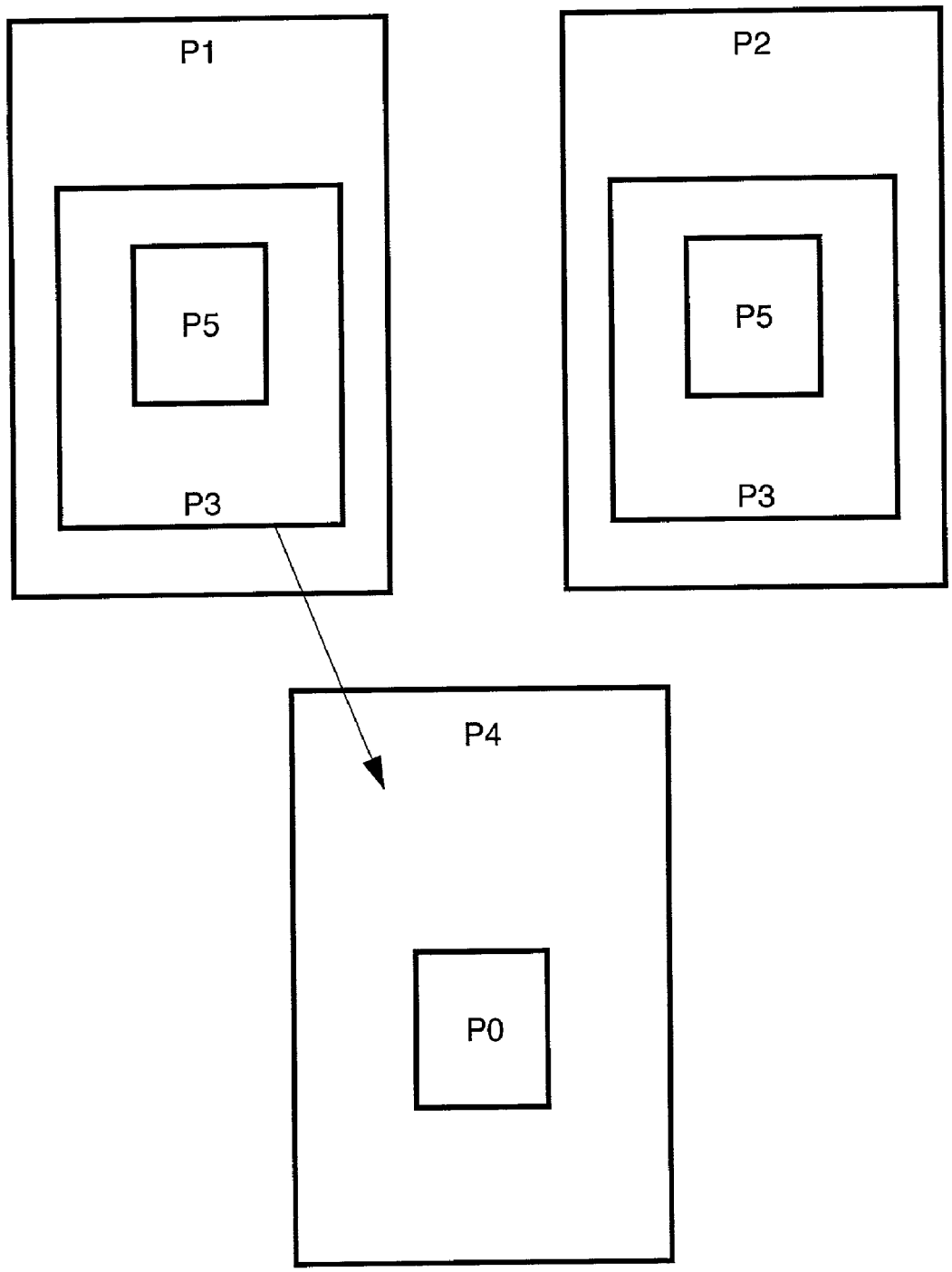
FIG. 4 is a block diagram showing a relationship between a set of fragments and compound objects in accordance with the present invention.

In one illustrative example, FIG. 4 depicts three Web pages, P1, P2, and P4. P3 is a fragment embedded in P1 and P2. And P5 is a sub-fragment embedded in P3. Similarly, P0 is a fragment embedded in P4. An arrow "A" from P1 to P4 indicates that P1 has a hypertext link to P4. In the illustrative example, FIG. 5 depicts an object dependence graph (ODG) corresponding to the objects in FIG. 4. The ODG indicates that any change to P0 also changes the value of P4. It also indicates that any change to P5 or P3 also changes both P1 and P2. Since P4 includes P0, P0 should be constructed before P4 when P0 changes. Similarly, P3 should be updated before both P1 and P2 when P3 changes. In addition, P5 should be recursively updated before both P3 changes and prior to P1 and P2 changing.

Whenever objects change, the system is notified in block 310. The system will be notified of a set of objects C which have changed. Changes to objects in C will often imply changes to other objects as well; the system applies graph traversal algorithms to detect all objects which have changed and an efficient order (or partial order) for computing changed objects. In block 320, a set of all objects S affected by the change is determined by a topological sort (or partial sort )of all (or some) nodes reachable from C by following edges in the ODG. Topological sorting of S orders the vertices so that whenever there is a path from a to b, a appears before b. A topological sorting algorithm is presented in *Introduction to Algorithms* by Cormen, Leiserson, and Rivest, MIT Press, 1990, Cambridge, Mass., incorporated herein by reference. Other topological algorithms may also be employed.

In block 330, objects in S are updated in an order consistent with the topological sort performed in block 320.

In block 340, objects are published. In one method, all servables are published in S concurrently. This avoids consistency problems. Another method publishes some servables in S before others, i.e. incremental publication. There are a number of reasons why incremental publication may be desirable. These reasons may include:

(1) In a number of environments, publishing documents after the documents are updated may be time-consuming. Incremental publication may make certain documents available sooner than would be the case using the all-at-once approach.

(2) It is conceivable that some environments may have constraints on the number of documents which can be published atomically. The incremental approach reduces the number of documents which need to be published in single atomic actions.

Incremental publishing may be more difficult to implement than the all-at-once approach because of the need to satisfy consistency constraints such as the ones described earlier.

Referring to FIG. 6, a method for incrementally publishing objects, for example, Web pages, which satisfies one or more consistency constraints described earlier is shown. In step 610, a consistency graph is created which includes servables as vertices/nodes. Edges of the consistency graph are referred to as consistency edges. A consistency edge from a servable c to another servable d indicates that d should not be published before c. Consistency edges do not imply the order in which c and d are to be generated. A consistency edge exists if there were a hypertext link from d to c and both d and c are in S. Such a link does not imply that c must be constructed before d, only that c should be published before or concurrently with d. It is entirely possible that data dependence edges indicate that d should be constructed before c even though c should be published before or at the same time as d.

Consistency edges are also used to indicate that two servables both embed a common fragment whose value has changed and thus are to be published concurrently. If c and d both embed a common fragment whose value has changed, then a consistency edge from c to d and d to c should exist.

It is now explained how to determine whether two servables both embed a common changed fragment. As a node a in S is constructed in the order defined by the topological sort in block 330, a set of comprising-nodes is computed for a. Comprising-nodes(a) includes identifiers for nodes in S which affect the value of a. Comprising-nodes(a) is the union of b and comprising-nodes(b) for edges (b, a) which terminate in a where b is a member of S.

A directed graph T is now created including servables in S (S is the set of all objects which have changed)and consistency edges. For two servables a and b in S, an edge from a to b exists in T if:

(1) A hypertext link from b to a exists, or (2) a and b both embed a common changed fragment. This is true if comprising-nodes(a) and comprising-nodes(b) have a node in common. In this case, a consistency edge from both a to b and b to a exist.

In step 620, graph traversal algorithms are used on T to topologically sort T and find its strongly connected components. A strongly connected component of T is a maximal subset of vertices T' such that every vertex in T' has a directed path to every other vertex in T'. The previously cited book, *Introduction to Algorithms,* by Cormen, et al. includes an algorithm for finding strongly connected components. Other algorithms for finding strongly connected components may also be employed. Each strongly connected component of T corresponds to a set of servables which can be published together.

In step 630, servables are published in the following order: Examine servables of T in topological sorting order. For a servable a of T, if a was part of a previously published strongly connected component, go to the next servable. Otherwise, publish all servables corresponding to the strongly connected component including a in an atomic action.

An extension of this algorithm may be to use either more or fewer consistency constraints in the method depicted in FIG. 6. Another extension may be to enhance the method to try to prevent publication of pages with broken hypertext links. The present invention may be extended to the publication of documents including but not limited to Web pages.

A quick publishing and censoring system and method which may be used is described in "METHOD AND SYSTEM FOR RAPID PUBLISHING AND CENSORING INFORMATION", U.S. application Ser. No. 09/283,562, filed concurrently herewith, commonly assigned and incorporated herein by reference. A system and method which may be used for publishing Web documents is described in "METHOD AND SYSTEM FOR PUBLISHING DYNAMIC WEB DOCUMENTS", U.S. application Ser. No. 10/924,286, filed concurrently herewith, commonly assigned and incorporated herein by reference.

Functional Block Diagram of Various Software Components—700

Figure 7:
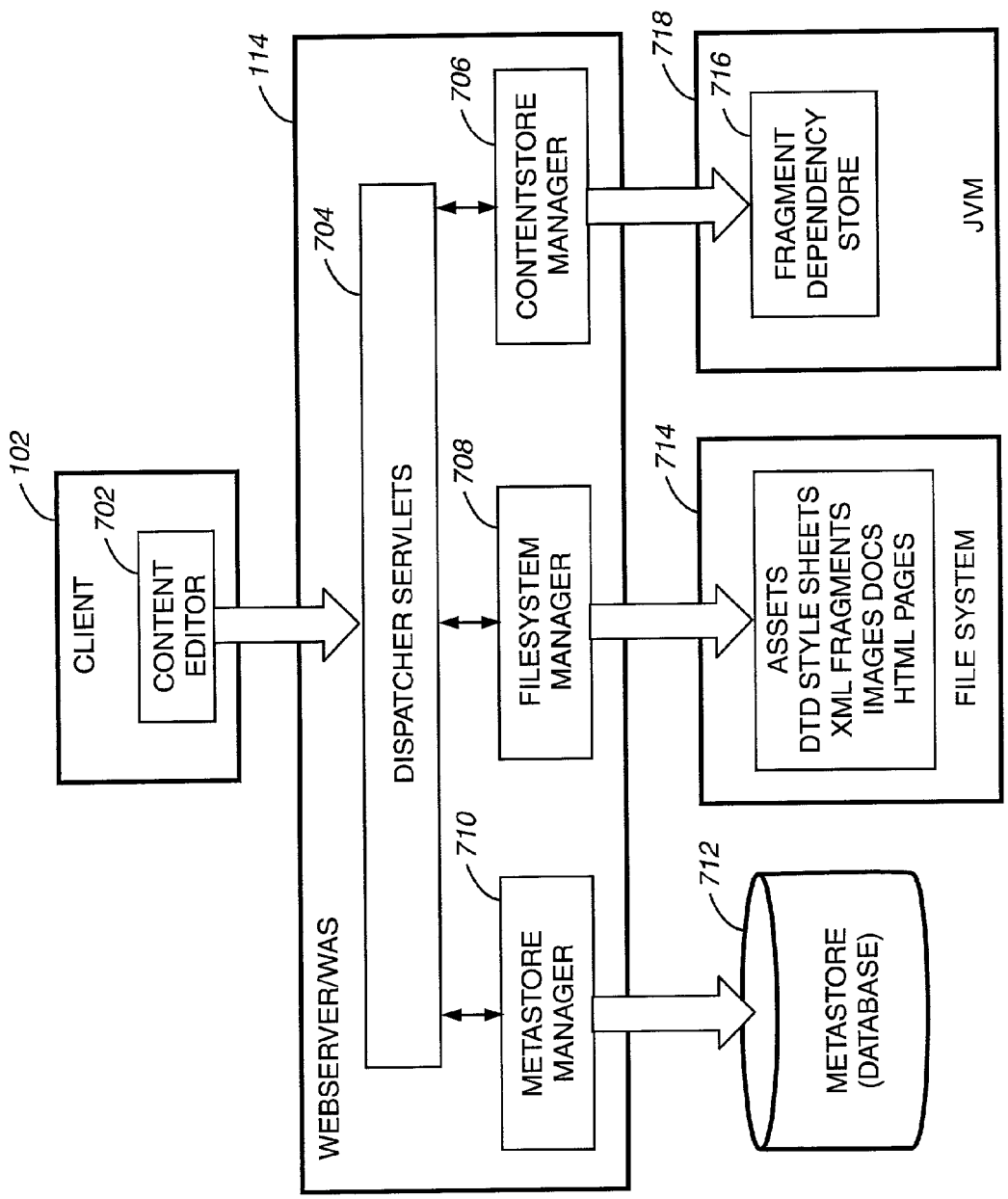
FIG. 7 is a block diagram of the various software components operating on the server of FIG. 1, according to a preferred embodiment of the present invention.

FIG. 7 is a block diagram 700 of the various software components operating on the server 114 of FIG. 1, according to a preferred embodiment of the present invention.

The system consists of the following main components:

1. Client editor application GUI 702
2. Dispatcher 704
3. MetaStore Manager 710
4. File system manager 708
5. Content Store Manager 706

The communication protocols between the different components are based on industry standards: WebDAV (World Wide Web Distributed Authoring and Versioning), DASL (Distributed Authoring Search Language), and HTTP (Hypertext Transfer Protocol). XML is used not only for creating the multimedia content, but also for system configuration documents at startup and as the language for information exchange between the different parts of the system. Now each of these software components 700 are described in further detail below.

Client Editor GUI—702

Client editor application GUI 702 running on client systems 102 and 106 that allows content creators to interact with the server 114. In one embodiment, the client editor GUI 702 is a standalone java application and in another embodiment the client GUI 702 is a Web-browser based interface. The GUI 702 allows the content creator to interact with the system 114. Through the client GUI 702, the user can create new documents, search for existing documents, check-out documents, check them back in after modification, and publish them. In addition, the client application also allows for previewing of the Web pages that will be created from the XML documents.

Data Model

As previously described above, the present invention operating on server 114 manages two types of content objects, fragments and servables. A fragment is a content object that can be reused on several pages:

- A simple fragment is an XML file that contains only text data and metadata, for example a product specification.
- A compound fragment is a simple fragment that contains a pointer to an accompanying file, such as a video or image file, an XSL style sheet, or a hand-crafted HTML page.
- An index fragment is an automatically updated XML file that indexes any number of servables, for example the five latest press releases.
- A composite fragment is a simple fragment that contains references and imports content from one or more fragments.
- A servable is a composite fragment that contains references to one or more style sheet fragments, which allow it to be transformed into one or more final published pages.

Each fragment type and servable type has an associated DTD (A document type definition (DTD) is a specific definition that follows the rules of the Standard Generalized Markup Language) that describes the structure of the XML document. The DTD specifies both metadata elements and content elements. In another embodiment, schemas specify the definition of the document structure. The DTD must abide to some constraints imposed by the present invention. The root element has a child node that is common to all documents called SYSTEM with the children:

FRAGMENTID, CREATOR, MODIFIER, CREATIONTIME, LASTMODIFIEDTIME, PAGETYPE and CONTENTSIZE.

These elements are shared across all documents and comprise the common metadata used in searches. These elements are not displayed in the interface, since their value can be inferred from the context. Additional metadata, such as KEYWORD and CATEGORY, are provided by common DTD elements to allow functional and semantic categorization of the fragments.

The metadata elements are used both at author-time and run-time. At author-time the metadata elements are used for categorization of fragments and for efficient searches of subfragments. At run-time, the same metadata elements can be used to perform personalization in a dynamic Web site.

A fragment can include other fragments as subfragments. This enables the reuse of content. To accomplish inclusion of a subfragment, the entity reference that defines all subfragment types must be included in the DTD. Currently, the declaration of a subfragment contains the SUBFRAGMENTTYPE attribute set to the appropriate document type, as illustrated in the following example:

<!ENTITY SUBFRAGMENTTYPES SYSTEM
"http://server/dtd/subfragmenttypes.txt">
<!ELEMENT SUBFRAGMENT (#PCDATA)>
<!ATTLIST SUBFRAGMENT SUBFRAGMENTTYPE
(% SUBFRAGMENTTYPES;) "IMAGEFRAGMENT"

where server is the name of the server 114.

This piece of a DTD specifies that a particular type of subfragment, IMAGEFRAGMENT, is needed as content for the element SUBFRAGMENT. The subfragment syntax will be replaced by the XLink syntax as it becomes a W3 recommendation and XML parser and XSL transformation engines support the syntax.

In the present invention, servables always result in one or more final published pages. The DTD of a servable indicates the names of the XSL stylesheets that can be used for layout for that particular type of document.

Because the servable includes content from subfragments, the stylesheet is written to work on the so-called expanded servable. Before page assembly, a servable is temporarily rewritten to include the content of all its subfragments. Thus the system implements a temporary solution that mimics the XLink functionality by expanding the servable.

In one embodiment, an IBM DB/2™/UDB database is used to store metadata that can be used either at author-time or run-time. In one embodiment, the mapping of the metadata elements of the XML document to the columns of the relational database is performed using the DB/2 XML Extender package. For each DTD, a Document Access Definition (DAD) is defined that specifies this mapping. The DAD is itself an XML document that abides to a particular DTD. Each DAD defines the relationship between the hierarchical structure of the XML document and the columns and tables of the relational database. The DB/2 XML Extender package uses the DAD to decompose the input XML document into the columns, or to compose an XML document from selected columns. A second embodiment that does not rely on DAD consists of the programmatic mapping of the XML elements into the database columns.

In summary, the addition of a new document type to the system requires the definition of a DTD and the corresponding metastore mapping. If the document is a servable, stylesheets defined in XSL are also required.

Automated User Interface Creation

One of the biggest challenges of any publishing system is to remove as much complexity from the users' tasks as possible. When dealing with a relatively new technology like XML/XSL this aspect of the system becomes even more important. By hiding the syntax of XML from the editors and authors, domain experts can take on the role of creating and modifying the content without worrying about the syntax of a particular markup language.

When using the Content Editor 702, the tagging syntax is never presented to the user. Instead, the present invention creates a set of input forms that the user can easily fill out. However, some users require placing simple HTML markup into text fields. The present invention does allow a small subset of HTML tags to be processed. However, this defeats many of the reusability and cross-platform publishing opportunities and is not a recommended strategy.

Users are assigned roles in the system and each role, in turn, is assigned specific document types. A user assigned to an edit role can only create or modify a document assigned to that role. When the user selects a document type to create or edit, the Content Editor 702 reads in the DTD and automatically constructs an interface based on that document structure. A user assigned to a publish role can only publish a document assigned to that role.

DTD to Interface

In this present invention, the term "interface controls" or "GUI widget" or just "widget" is used to describe an element of a GUI 702 that displays information or provides a specific way for a user to interact with the operating system and application. Widgets include icons, pull-down menus, buttons, selection boxes, progress indicators, on-off checkmarks, scroll bars, windows, window edges (that let you resize the window), toggle buttons, forms, and many other devices for displaying information and for inviting, accepting, and responding to user actions.

The Content Editor 702 creation algorithm for the GUI 702 first constructs the basic interface from the DTD. This algorithm recursively adds widgets, such as textbox or dropdown list, to the display as necessary. If a new XML document is being created, empty widgets are created. As the editor enters content, the widgets are interactively filled in. However, if an interface is generated from an existing XML document, the existing content is displayed in the widgets. In addition, if elements are repeated in the existing XML document, additional widgets are generated in the interface as needed.

The present invention uses a number of assumptions in handling DTDs and the automatic creation of the user interface. Most notably, special attributes are used to assist in the transformation of an XML element into an appropriate interface widget. In one embodiment, the interface widgets are created for DTD elements, not for DTD attributes and a special type attribute for these elements enables the transformation into an appropriate interface widget.

Until XML schemas (see online URL www.w3.org) become widely adopted, there is no standard way to provide data typing for elements in the DTD. The present invention solves this problem by including the attribute, DATATYPE, whenever an element is to be displayed in the interface If an element does not contain a DATATYPE attribute no widget is created in the interface for that element. Children elements, however, may still contain DATATYPE attributes to specify their user interface. In addition, whenever an element has the DATATYPE attribute, it contains a child of type PCDATA. Thus, through typing the DTD can specify, for example, whether a one line input, a medium text area or a large text area is required.

In the partial DTD shown here, TITLE, SHORTDESCRIPTION, and BODY each specify different text input widgets to use.

```
<!ELEMENT TITLE (#PCDATA)>
<!ELEMENT SHORTDESCRIPTION (#PCDATA)>
<!ELEMENT BODY (#PCDATA)>
<!ATTLIST TITLE DATAYTPE
    (%UITYPES;) "STRING" #FIXED>
<!ATTLIST SHORTDESCRIPTION DATAYTPE
    (%UITYPES;) "SHORTTEXT" #FIXED>
<!ATTLIST BODY DATAYTPE
    (%UITYPES;) "LONGTEXT" #FIXED>
```

The external entity UITYPES contains the list of all GUI widgets known to the editor. These data types include:

DATE—widget accepting only a date entry.
INTEGER—widget accepting only a numerical entry.
STRING—a one line text box widget.
SHORTTEXT—a short multi-line text area widget.
LONGTEXT—a long multi-line text area widget.
CHOICE—a drop-down menu that stores user's selection.
ASSOCLIST—a drop-down menu that stores code corresponding to user's selection.
BROWSESERVER—a widget enabling directory browsing on the server.
BROWSELOCAL—a widget enabling directory browsing on the local machine.
LABEL—a non-editable widget displaying the name of the element.

In another embodiment, additional types may be used.

A widely used interface widget is the drop-down menu. To accomplish this, the DATATYPE attribute is set to the UITYPE CHOICE, and the CHOICES attribute to a default value from a list of options. The options can be defined as an external entity for reuse across many DTDs. For example,

```
<!ENTITY % CATEGORYDEFS SYSTEM
    "http://server/dtd/categorydefs.txt">
``` defines an external entity for a set of category choices.

These choices could be defined as the types of IBM Netfinity™ Servers:

NONE|Netfinity_8500 R|
Netfinity_7000_M10|Netfinity_5500_M10|
Netfinity_5600|Netfinity_5500

The definition for CATEGORY in the DTD might then be:

```
<!ATTLIST CATEGORY
    DATATYPE (%UITYPES;) "CHOICE" #FIXED
    CHOICES    (%CATEGORYDEFS;)    "NONE"
        #REQUIRED>
```

The content editor creation algorithm assumes that if the first word in the set of CHOICES is the string NONE, and the user selects it and the element is optional, the XML element will not appear in the document.

In a DTD, elements can either be required, optional, or occur 1 or more or 0 or more times. If an element can appear more than once buttons appear next to the widget or group of widgets for replication, as shown in FIG. 9. The buttons allow the user to repeat a group of GUI widgets more than once or to remove a repeated group of interface widgets.

In the present invention, auxiliary lookup tables further expand the definition of the DTD, beyond what the DTD syntax permits. These lookup tables are encoded as XML files which are read by the client GUI into a hash table for fast access to the information. An auxiliary lookup table can store various additional information. In one embodiment, the lookup table stores the DATATYPE values for each DTD element. In another, a lookup table stores all translations of element names and help strings, as well as the labels in the GUI, to a given language. More specifically, when a user logs in and the GUI is initialized, the default language in the user's profile determines which translation lookup table to load. The GUI uses the lookup table to display all labels, DTD element names and help strings in the appropriate language. In yet another embodiment, a lookup table stores a more user friendly display name for DTD elements, to help make the GUI more approachable by a non-technical editor. The auxiliary file could be used for further information not limited to the types of information listed above.

Using the client editor GUI 702 the editor logs into the system 114, the interface is customized to the particular roles of which the editor is a member and to the default language specified in the user profile. The GUI 702 provides a "point and click" interface to an editor so that the exact requirements and syntax of XML are hidden. The editor can choose to create new document from the lists provided in the interface or search for existing documents to edit. Typically, the editor will begin by creating reusable information fragments, such as images, video, sound and other multimedia assets, and other reusable data such as technical specifications or descriptions. After the editor has created these fragments, composite fragments can be constructed. References to the reusable fragments previously constructed will be included in these new composite documents.

Turning to FIG. 8, shown is a GUI 800 to enable the creation/modification of multimedia content, according to the present invention. In this example, the GUI 800 is divided into two major areas. The left panel of the GUI 802 displays a working set of document fragments and the right panel 820 is an editor pane editing a specific image fragment. Suppose in this example, the editor is a product manager for a line of portable computers, the IBM ThinkPad™. The product manager may wish to create a new fragment (i.e. a portion of a Web page or Web pages) detailing the new portable computer offering. Using known relational database techniques, a database 712 is searched for content that may be useful to the product manager. The search may be by category, by keyword, by title, by author, by last modification date and any other searchable field in the database. The left panel illustrates the partial results of a query in the database 712. Shown is the left panel divided into four areas, title 804, doctype 806, revision date 808, and creator 810. Shown selected here is a row of information 812. In this example, the product manager is creating a new image fragment and enters content to the fields 820–832 including the directory to save the file 828, the name for the file 830 and a pointer to the image 832 to be uploaded from the local machine to the server.

FIG. 9 is a GUI 900 illustrating how elements presented can be replicated, according to the present invention. The −/+ buttons 902–910 are used to add and remove widgets from the GUI 900, and as a result, elements in the XML file. For example the software category 928 may have more than one entry for a given product description. Returning to the product manager example for IBM ThinkPad™ there may be one or more applicable hardware options such as "AS400™ Servers and Workstations" 922 and "Monitor and Displays" 924. The creation of these forms is based directly on the DTD. It is important to note that in both FIGS. 8 and 9, the specific syntax of XML is hidden from the user/editor thus simplifying the interface.

Because of the strict way that the interface is constructed, each widget knows whether or not it is required and whether or not more elements can be added to an XML instance. If an element in the DTD is required, the widget will be highlighted (e.g. colored brightly) to allow the user to distinguish which fields must be filled in before submission. Therefore, only well-formed and valid documents are submitted to the server.

Although the present invention uses existing XML technologies and standards with, newer standards, such as XLink and XML Schema, and technologies based on those can be leveraged to improve the design and the implementation of the present invention. As it should be understood that the user of those technologies are within the true scope and spirit of the present invention.

In yet another embodiment a number of features including automated extraction of keywords, automated translation and a Web-centric client that requires no installation and can easily be accessed from any browser.

Object Oriented GUI

Each Java widget is encapsulated in a set of classes that include additional functionality. This object-oriented approach allows for modular design and future extensions to the set of interface widgets. Inheritance and generic methods are used throughout the class hierarchy for the definition of the interface widgets. Each UITYPE may also provide very specialized functionality. For example, BROWSELOCAL and BROWSESERVER provide a button which, when clicked on, opens a dialog to choose a file on the local system or a directory on the remote server, respectively. This functionality is encapsulated within these particular classes. These widgets are illustrated in FIG. 8.

UITYPE LONGTEXT element tags are also handled specially within the system. The system assumes that UITYPE LONGTEXT tags may be composed of one or more PARAGRAPH tags. Blank lines in the input are interpreted as paragraph separators. When constructing the XML document, these PARAGRAPH tags are automatically composed within the outer U ITYPE LONGTEXT tag. This functionality is inherited through the text widget class hierarchy. In general, this functionality can be enabled or disabled as the application requires.

Process Flow For Client Editor GUI

FIG. 13A is a process flow 1300 for the client editor GUI 702 that builds the GUI interfaces as shown in FIGS. 8 and 9 used in the overall process flow 1000 of FIG. 10, according to the present invention.

When launching the GUI interface, the user enters a user name and password. Based on the roles assigned, the user is authorized to create certain types of documents. Only authorized document types appear in the user's GUI. For example, someone outside of accounting would not be authorized to create a bill.

Get DTD & Parse DTD—1302–1306

The process begins with step 1302 with the user selecting from a menu a document type that they wish to create. Once the user makes a selection the corresponding DTD is retrieved from the file system 714 in step 1304. Next in step 1306, the DTD is parsed. One parsing tool which has been used is Xerces (refer to online URL http://xml.apache.org/index.html for more information.).

Type and context information—1308

Function—For every element in the DTD, the following information is determined: 1) its location in the hierarchy (its XPath); and 2) type information for DTD elements.

Output—Type (e.g., a single line of input, multi-line input, choice element, etc) and context (XPath) information for each element in the DTD.

Mapping Information for Type and Context—1310

Function—Given a DTD element, its type and its XPath, the system maps this input information to the GUI values for generating the interface for that element. The system uses the editor's user profile and lookup tables to determine the values. These GUI values include but are not limited to:

1) the type of input widget to display in the interface, (e.g. simple 1-line string, multi-line text area, drop-down menu, directory browser for server, directory browser for local machine, etc).
2) the name to display in the interface, translating the element name to user friendly text in the user's preferred language using a lookup table.
3) the value of a help string to be made available in the interface if the user needs it (e.g., as a tooltip) in the user's preferred language.

Input—DTD element name, its type and Xpath, and attributes from editor's user profile from 1308. Output: GUI values to display DTD element.

Generate GUI—1312

Function—Taking the input information, this step processes the DTD elements in order and recursively, while maintaining hierarchical inclusion, generates the GUI 702 as a set of interface widgets to be edited by the user. The hierarchy can be represented by indentation within the interface to indicate when one item is included by another. During this recursion, the process maintains a link between the interface widget and the corresponding element in the XML document under creation. If the interface is constructed for an existing XML document, the previously stored content is supplied to be displayed in the widgets. An existing XML document may also contain more than one occurrence of an element. If so, the process adjusts the interface accordingly and adds the elements. Also, the process maintains and displays information about whether an element is required or not in the final document. This information is used in the test in Check in step 1324. If an element can occur more than once in the interface, affordances are placed in the interface (i.e., "+/−" buttons) so that the user can easily repeat or delete repeated elements from the XML document being created/edited.

Input: the GUI values to display DTD elements from 1310. Content from 1314 if editing an existing document.

Output:—the interface to display in either a web-based client or standalone java client, with content if generating from an existing XML document.

Content from Existing XML Document—1314

Function—This step incorporates the content of an existing document into the GUI being constructed.

Input—XML file from file system 714.

Output—The content to be displayed in the interface.

Display GUI—1316

The results of the user input are then used to generate the GUI 702 with all the GUI widgets and user input from steps 1302–1312.

FIG. 13B is a process flow 1320 for the client editor GUI 702 that checks-in the document after it is constructed into the process flow 1200 of FIG. 12, according to the present invention. The editor enters content for an XML document using the widgets in the GUI in step 1322. Once the user is satisfied with the document, the user checks-in the document in step 1324 or 1202 of FIG. 12.

Create XML document from GUI widgets—1330

Function—The process extracts the content from the GUI widgets and places it into the XML document being constructed. This is accomplished by looping over the hashtable to get each widget and its corresponding XML element, extracting the content from the GUI widget and placing it into the XML element. To do this we encapsulate this information in the interface object with generic GET and SET methods. This allows us to call a standard method, independent of type, on the interface object to get user input and place it into the XML element.

Input—XML document being created or edited and the hashtable that stores the GUI widgets and their corresponding XML element.

Output—An XML document that represents the complete document filled in with the content from the GUI widgets Check-in Process 1324–1336

In step 1326 a test is made to determine if the document is valid, that is, if all the required fields are filled-in. If any required field is not filled in the user is notified in step 1328, otherwise the process continues onto step 1330. In one embodiment, user is also notified if certain required fields that have choices such as "not applicable" or "none" are not filled-in. An XML document is created from the GUI widgets in step 1330. In step 1332 any empty optional elements are removed and in step 1334 any optional categories set to values such as "not applicable" or "none" are also removed. Lastly the document is submitted to the server 114 for processing as described in step 1212 of FIG. 12.

Dispatcher—704

The Web application consists of four servlets and three subcomponents. The main servlet is the dispatcher that coordinates the activities of all subsystems and interfaces with the client application. The source and sink servlets allow Trigger Monitor to retrieve fragments from the file system and write assembled pages to it. The admin servlet provides for administration and monitoring functionality. The three subsystems interface with the metastore 712, the fragment dependency store 716 and the file system 714 respectively.

A dispatcher 704 which is a Web application running within the Web server 114 that coordinates the activities of all subsystems and interfaces with the client application. The source and sink servlets allow fragment dependency store 716 to retrieve document fragments from the file system 714 and write assembled pages to it. The dispatcher 704 consists of a number of servlets and three subcomponents: (1) metastore manager 710; (2) file system manager 708; and (3) content manager 705. The main servlet is the dispatcher that coordinates the activities of all subsystems and interfaces with the client application.

MetaStore Manager—710

A MetaStore Manager 710 that provides an interface (e.g. Java DB/2 interface) to a database 712 that stores the meta-information about the assets stored in the file system 714. The metastore 712 maintains information about the functional and semantic role of each item of content. The metastore 712 also supports fast searches of content and maintains state information. The functionality of the metastore 712 is described in more detail in a later section.

File system manager—708

The file system 714 is where the components or assets for the documents are stored. A file system manager 708 that provides a standard interface (e.g., SCSI, IDE, FDDI, TCP/IP) with a file system 714 where assets such as DTDs, XML fragments, Images, Documents, and HTML.

Content Store Manager—706

A Content Store Manager 706, is an application, in this embodiment a Java application, that maintains the dependency information between assets i.e., XML servables, XML fragments, binary assets and XSL style sheets stored in the file system 714 and the fragment dependency store 716. The fragment dependency store 716 is further described in a section below. The fragment dependency store 716 is designed to manage high numbers of rapidly changing content fragments. By maintaining an Object Dependency Graph, and by detecting changes to content, it manages pages on a Web server in a timely manner. The fragment dependency store 716 allows the loading of specialized handlers to perform tasks specific to a particular application.

MetaStore—712

The metastore 712 is used to maintain information about the functional and semantic role of each fragment. The meta-information stored in the metastore 712 is grouped into system-generated tags and non-system generated tags. The values of the system-generated tags are generated by the dispatcher when a check-in is successful. The values of the non-system generated tags are specified by the content creator during the creation of the corresponding document.

The system-generated tags correspond to the children element of the SYSTEM element defined in every DTD, as described in an earlier section. The non-system generated tags correspond to additional elements in the DTDs that contain the content or are necessary for maintaining the functional and semantic role of the fragments. These tags can be further grouped into two parts: 1) the tags which are used for describing the XML object, such as keywords, categories and publishing information; and 2) the tags which hold the content of the XML object, such as TITLE and SUMMARY.

In one embodiment, the metastore 712 is implemented as a DB2/UDB database. In one embodiment, the metastore 712 is based on a fixed set of DB/2 tables for all fragment types, but can be extended to include specific table(s) for different fragments.

IBM DB/2™ is a relational database, and thus cannot be used directly to store an XML object, because the XML object has a hierarchical data model. A mapping from XML data model to a set of database tables is needed. In one embodiment, DB/2 XML Extender 7.1 is used to map the XML document elements that correspond to the metatags into a set of pre-defined DB/2 tables. The DB/2 XML Extender is an IBM product developed to support the XML-based e-business applications using the IBM universal database—UDB.

The XML Extender provides two access and storage methods in using DB/2 as an XML repository: XML column and XML collection. The XML collection access method decomposes XML documents into a collection of relational tables or composes XML documents from a collection of relational tables. These are exactly the operations required for the metastore 712, thus the access method used is the XML collection method. The XML collection implementation of XML Extenders requires one DAD for each DTD that has to be mapped into DB/2. The DAD file is used to define the relationship between the XML tags to the tables of the relational database.

A second embodiment consists of a programmatic mapping of the XML elements into the database columns.

Search

For a content management system that will potentially have a very large number of interrelated documents and fragments, finding and locating a particular fragment or servable efficiently becomes one of the major challenges. Accordingly, such an operation based on a directory structure browsing operation is both inefficient and unreliable. The browsing operation is replaced with a search operation that leverages the meta-information that is stored in the metastore 712. One of the essential functions of the metastore 712 is to enable this search paradigm.

The search feature requires implementation at both client and server sides. At the client side 102, the GUI 702 provides a search dialog that allows graphical construction of search queries. The search query consists of the conjunction of elementary search conditions. The search conditions are created based on an initial XML specification sent from the server that specifies the searchable elements, the relational operators that can be used with each element, and in some cases the set of values that element can assume. The client converts the query into a DASL query. As it receives the response from the server, the search dialog parses the results and displays them in a tabular format. From the table, the editor can select items that can be used in the editor.

At the server side 114, when the dispatcher receives the search query, it invokes the search module within the MetaStore Manager 710. The search module converts the DASL response into an SQL query dynamically, and queries the metadata database 712. It then converts the search result into DASL format and returns it to the client.

In order to ensure the scalability of the application, a number of techniques have been used to streamline database access operations. First, a database connection pool is used to maintain a set of active connections, instead of creating a new connection for each access. Second, the search fields are indexed in the database to speed up search operations. Third, the search results are cached to minimize repeated access to the database for the same query from the same client 102.

Fragment Dependency Store—716

The fragment dependency store 716 builds upon the Trigger Monitor technology from IBM Watson Research. In one embodiment, the fragment dependency store runs as a Java Virtual Machine 718. The fragment dependency store 716 is designed to manage high numbers of rapidly changing content fragments. By maintaining an Object Dependency Graph, and by detecting changes to content, it manages pages on a Web server or cached in a network router in a timely manner. Trigger Monitor allows the loading of specialized handlers to perform tasks specific to a particular application. One system for achieving maximum flexibility and reuse is disclosed in the patent application entitled "Method and System for Efficiently Constructing And Consistently Publishing Web Documents" filed on Apr. 4, 1999 with application S/N 09/283,542 with inventors JR Challenger et al. now [Pending] and commonly assigned herewith to International Business Machines, which is hereby incorporated by reference in its entirety. In addition more information on Trigger Monitor is found in the following publications which are hereby incorporated by reference in their entirety: (i) Jim Challenger, Paul Dantzig, and Arun lyengar. "A Scalable and Highly Available System for Serving Dynamic Data at Frequently Accessed Web Sites" *In Proceedings of ACM/IEEE* SC98, November 1998; (ii) Jim Challenger, Arun lyengar, and Paul Dantzig. "A Scalable System for Consistently Caching Dynamic Web Data." In *Proceedings of IEEE INFOCOM* '99, March 1999; and (iii) Arun lyengar and Jim Challenger. "Improving Web Server Performance by Caching Dynamic Data." *In Proceedings of 1997 USENIX Symposium on Internet Technologies and Systems,* December 1997.

The fragment dependency store 716 uses IBM Research's Trigger Monitor system to automatically propagate fragment changes to all affected fragments and servables, and to allow for multi-stage publishing to accommodate quality assurance. The fragment dependency store does this by creating an Object Dependency Graph (ODG), a directed acyclic graph within Trigger Monitor, which represents the inclusion relationships of all fragments in the system.

Several Trigger Monitor stages are chained together to allow for multistage publishing. Trigger Monitor is written in pure Java running in Java Virtual Machine 718 and implements handlers as pre-defined actions performed on the various configurable resources. Flexibility is achieved via Java's dynamic loading abilities, by more sophisticated configuration of the resources used by Trigger Monitor, and through the use of handler preprocessing of input data. Most entities defined in a configuration file implement a public Java interface. Users may create their own classes to accomplish localized goals, and specify those classes in the configuration file. This permits run-time flexibility without requiring sophisticated efforts on the part of most users, since default classes are supplied to handle the most common situations.

In the present invention, several classes have been created for Trigger Monitor to implement three handlers:
1. the Extension Parser;
2. the Dependency Parser; and
3. the Page Assembler.

Each of these classes are now described.

Extension Parser

Within the present invention, Trigger Monitor manages different types of files differently based on their extensions. Servables, simple, compound, and index fragments, stylesheets and multimedia assets are all treated slightly differently in the publishing flow.

The Extension Parser takes in a name of a fragment, and returns an extension used in the Trigger Monitor configuration files to specify actions to take during the publish process. The appropriate behavior for each type of fragment is defined in the Trigger Monitor configuration files. These behaviors include moving assets to different stages within the system as well as assembling the servables into the expanded mode described in an earlier section and invoking the XSL transformation to create viewable pages.

Dependency Parser

The Dependency Parser analyzes an XML object and updates the ODG maintained by Trigger Monitor accordingly. The ODG maintains the dependencies between fragments. Currently defined are two types of dependencies: composition and style. The composition dependency maintains structural information between fragments and between a complex fragment and its associated asset. The style dependency maintains information about the relationship between servables and stylesheets.

Dependencies are considered to point from the subfragments to the fragments that include them. In the case of complex fragments, the dependency is from the fragment to the associated assets.

Page Assembler

Trigger Monitor is configured to invoke in the present invention Page Assembler for servables. The Page Assembler assembles the servable into the expanded mode by including the contents of all included subfragments, and then invokes the XSL transformation engine to produce viewable output pages. As discussed in an earlier section, the first step of creating an expanded XML is a method used in the absence of a final XLink standard, and the lack of tools that handle XLink constructs.

The type of the viewable page, as well as its target device, is determined from the stylesheet. The assembled XML and all the resulting viewable pages are written to one file, which is later split up, and the these pages are written to the appropriate directories on the server 114.

Chaining of Trigger Monitor Stages

Currently, two Trigger Monitor stages are used in the publish process. They share an ODG, and the sink of the first one is the source of the second, creating a publishing chain.

When a fragment is checked in to the Content store, it is added to the shared ODG, and a publish command is issued to the first handler. Trigger Monitor reads the fragment XML from the source servlet, uses the extension parser to find its extension, and then uses the dependency parser to find dependencies to add to the ODG. The page assembler then pulls in the contents of the fragment's subfragments, and if the fragment is a servable, combines it with its stylesheets to produce the output pages (e.g., HTML files). The servable XMLs, output pages, binary files, and stylesheets—all fragments affected by the check-in—are sent to the servlet specified as the sink of the first handler. When a servable has been approved, a publish command on the servable fragment is issued to the second handler. It is reassembled and recombined with its XSLs, and the resulting XML and output pages are published to the production Web server through a second sink servlet. Binary files (such as images) are also published to the second sink. This is where the Web server pulls the final HTML and image files from.

Detailed Process Flow—1000

FIG. 10 is an overall block diagram illustrating the process flow 1000 of the end-to-end publishing process according to the present invention. The following scenario describes how the system described here reuses information fragments and can easily update the presentation throughout a published information space (e.g., WebSite). There are at least four inputs that are needed to begin the publishing process according to the present invention. The four inputs, which in one embodiment are carried out by third party tools or in some instances manually prior to the process flow of the present invention are as follows:

1. Information Analysis and Modeling 1002. This provides information on "what" the published Web site is about. This may involve building a site map, database modeling, and market analysis.
2. Target Audience Analysis 1004 are empirical surveys on "how" the information should be presented. It includes the choice of languages for the GUI to support a multi-lingual editor community, and the choice of languages for the final published content collection.
3. Target Device Analysis 1006 are empirical surveys on "where" or on "what device" information is presented e.g. a type of computer, a PDA, a cell phone, or other information processing device capable of presenting information to a user.
4. Workflow and Role Analysis 1008

The four inputs above assist in defining how the information on the site should be organized and decomposed into reusable fragments of information. The analysis will directly impact the document templates, stylesheets, and auxiliary lookup tables that get constructed. In addition, this analysis will inform the process of defining the meta data that will be stored in the metadata database 712.

The end result from this process inputs 1002–1008 is an understanding of the set of document templates (e.g. DTDs) for all information fragments, a set of corresponding stylesheets (e.g. XSL), a set of lookup tables that store additional information on DTD elements including translations, and a set of workflow roles that allow editors to access particular document types.

Identify Meta Information, Servables and Fragments—1010

Next in process step 1010, all the meta information to describe the content, that is any information helpful for indexing the content in metastore database 712 needs to be defined. Some mMeta information such as title, author, contents, revision date, and document type are indexed by default. This metadata is not only used for finding content during authoring on content editor 702 but is also used for personalization of the content during presentation in step 1024.

Function—Information architects and system designers identify the metatags and document types that will be used throughout an implementation of this process. They determine the fragmentation granularity and the composition of each servable and fragment from sub-fragments.

Input—The input is the results of the modeling and analysis from the external modules for information analysis, target audience analysis, target device analysis and workflow and role analysis.

Output—The output from this step is information to guide the construction of the metastore 712, the document templates and the stylesheets constructed in steps 1012, 1014 and 1016.

Initialize MetaStore—1012

Function—A database administrator creates the metadata database(s) 712 and database tables.

Input—Input is a database management tool and the results of step 1010. This includes the type of meta tags to be included in the tables within the metadata database 712.

Output—The metadata database 712 is initialized and made operational. The tables and columns are setup in the database 712 that will allow for the storing and searching of documents within the system.

Create Document Templates—1014

Function—A domain expert creates document templates that define the structure of the servables and fragments identified in step 1010. In addition, auxiliary lookup tables for DTDs as well as the DTD-to-database mapping files.

Input—The input is the results of the information modeling and analysis modules (1002-1008) from step 1010.

Output—Multiple document templates (e.g., DTDs or schemas) that define the structure of each document type. These templates describe the structure of each document fragment and servable and how the elements in the document are related, including how many times (1 required, optional, 0 or more, or 1 or more, etc) the element will appear in the final document. The lookup tables contain more information on each DTD element, such as the type information for each element, help strings, and any translations to more user friendly names or other languages. The lookup table allows for the GUI to be automatically generated from the DTD. Further files specify the mapping of DTD elements to database tables.

Create Stylesheets—1016

Function—A designer creates the stylesheets that determine the presentation and layout of the information in each servable for each target audience and target device.

Input—Results of the analysis modules, and results of step 1014.

Output—The output is multiple stylesheets for each servable document for each specified device.

Create/Edit and Compose Content—1018

Function—Authors and editors create content for the Web site. A more detailed description of this step with sub-steps is given in FIG. 11.

Input—Content creation interface 702, document templates, knowledge about the requirement for new content or about the necessity to edit existing content.

Output—Content files in file system 714, meta information in metastore 712, information about the content dependencies in the object dependency graph.

Preview and Approve Content—1020

Function—Authors, editors and approvers view the output produced from the content using the selected stylesheets.

Input—XML content and stylesheets along with the viewing interface on client editor 702.

Output—The output is the fully rendered pages on the Web or simulated on various devices (e.g., PalmPilo™) to be reviewed by appropriate person in the workflow.

Publish—1022

Function—Approvers and publishers publish the content to the presentation system.

Input—Input consists of the content created in step 1018, stylesheets created in step 1016, and the knowledge that the servables are ready for publishing from step 1020.

Output—Approved output pages are sent to the presentation engine.

Presentation Engine—1024

Presentation engine such as IBM's WebSphere™ platform is used to present the resulting Web page.

Details of Create/Edit Process Detail Flow—1100

The following is a further detail of the process flow 1000 of FIG. 10 for the Creat/Edit Process 1018, according to the present invention.

Editor Selects Type of New Document—1102

Function—The editor selects the type of document to be created from a menu of possible types available for this person in the roles that they are associated with.

Input—A list of the document types that the particular editor can create.

Output—The output is the selection of a particular document type to edit. This may be a fragment or servable document type.

System Dynamically Creates a Blank Form—1104

Function—The system creates a blank form based on the document template for the particular document type chosen.

Input—The user selection from 1102 and the document type definitions from step 1118.

Output—A form displayed in the client GUI 702 that allows the user to interactively add the content to the form. The form is based on the document template and only allows valid documents to be constructed based on the specification in the document type definition.

Editor Searches and Selects a Document—1106
Function—The editor searches and selects an existing document using the metastore 712.
Input—The search interface allows the user to specify the constraints of the specific documents they want to retrieve.
Output—The output is the selection of a particular document to retrieve from the file system 714.

System Retrieves the Document—1108
Function—The system retrieves the document.
Input—The input is the user's selection from step 1106 and the documents already created in the system.
Output—The output is the XML document and its attachments (if any).

System Dynamically Creates a Form and Fills it in—1110
Function—The system dynamically creates a form similar to the form created in step 1104. But in this case, the system automatically fills it in with the values of the elements from the selected document.
Input—Input is the retrieved document from 1108 and the document definition from 1118.
Output—A form displayed in the client GUI 702, with the fields of the form initialized to the values of the elements of the retrieved document.

Editor Fills in the Form—1112
Function—The editor fills the form with content for the newly created document.
Input—Input to this step is the form created in step 1104.
Output—The output is the form with all required fields filled in.

Search/Select Sub-Fragments—1114
Function—The editor searches for subfragments and, if necessary, references them in the document being created/edited.
Input—The search interface is used to find relevant subfragments inserted into the document being created/edited.
Output—The output is a reference to a subfragment placed into the form of the current document.

Editor Modifies the Form—1116
Function—The editor modifies the form of an existing document.
Input—Input to this step is the content and form created in step 1110.
Output—The output is in the form with all required fields filled-in.

Editor Checks in the Document—1118
Further details are given in the functional block diagram of FIG. 12.
Function—The editor checks in the created document.
Input—Input is the filled in document in the editor window from either creating a new document 1112 or editing an existing one 1116.
Output—Output is the acknowledgement of the checkin process 1200.

FIG. 12 is a functional block diagram 1200 of the check-in document process of FIG. 10, according to the present invention.

Details of Editor Checks in Document 1202
Function—The editor checks in the document to save it in the system.
Input—The form input from either a newly created document 1112 or a modified existing document 1116.
Output—The output is an XML document that conforms to the document template for the specified document type.

Save Document as XML File—1204
Function—The document is saved in the file system 714.
Input—XML document from step 1202 is provided as input.
Output—The output is the XML file in the file system 714.

Save Attachments—1206
Function—Any uploaded attachments (e.g., stylesheets, images, etc) to the XML document are saved in the file system 714.
Input—The input is the content transferred to the server along with the XML document from 1204.
Output—The output is the attachments saved in the file system 714.

Save Meta Information in Metastore—1208
Function—Meta information from the XML is saved to the metastore database 712. This includes automatically constructed data, such as user and modified time, as well as application specific meta tags such as, category definitions.
Input—The XML file being saved is the input to this step.
Output—The output is the meta data in the appropriate tables within the metastore database 712.

Update ODG—1210
Function—The function of this step is to update the object dependency graph (ODG) with the various links between fragments. These links are inclusion links (e.g., subfragments included within another fragment) and other links such as stylesheet links (e.g., links between stylesheets and their servables)
Input—Input is the XML file from step 1208 with references to other fragments (e.g., subfragments or stylesheets)
Output—The output is an updated ODG with proper interdependencies between fragments in fragment dependency store.

Generate Preview Pages—1212
Function—The purpose of this step is to cache the preview pages so they are immediately available when editors/approvers want to preview the servable pages.
Input—The update to the ODG 1210 triggers a publish of the servable pages from the XML file.
Output—The output is the temporary preview files in the file.

While the invention has been illustrated and described in the preferred embodiments, many modifications and changes therein may be affected by those skilled in the art. It is to be understood that the invention is not limited to the precise construction herein disclosed. Accordingly, the right is reserved to all changes and modification coming within the true spirit and scope of the invention.

The invention claimed is:

1. A computer-implemented method for creating two or more XML documents for publishing using an object dependency graph, the method comprising:

defining a first XML document and a second XML document based upon one or more reusable content objects, whereby at least one of the content objects includes at least one object dependency graph that identifies content object dependency across the first XML document and the second XML document using one or more edges denoting relationships between one or more of the content objects so as to provide synchronization of the content objects across the first XML document and the second XML document;

building the first XML document so as to form a self-contained accumulation of the one or more content objects in accordance with the object dependency graph;

building the second XML document so as to form a self-contained accumulation of the one or more content objects in accordance with the object dependency graph; and in response to a value of the content objects being modified, a change is made across one or more output pages concurrently by automatically invoking an XSL transformation engine to transform the first XML document and the second XML document so as to produce the output pages.

2. The method according to claim 1, wherein the invoking an XSL transformation engine includes producing viewable output pages in HTML.

3. The method according to claim 1, wherein the defining the first XML document and the XML document based upon one or more reusable content objects includes defining the first XML document and the second XML document based upon one or more content objects, the objects comprising at least one of a fragment and a servable.

4. The method according to claim 3, wherein the one or more reusable content objects comprise at least one content fragment which is a self-contained fragment.

5. The method according to claim 3, wherein the one or more reusable content objects comprises at least one content fragment which is a compound fragment.

6. The method according to claim 3, further comprising: publishing the one or more viewable output pages.

7. The method according to claim 6, wherein the publishing includes at least one of:

publishing the one or more viewable output pages as Web pages; and publishing the one or more viewable output pages to other media or devices.

8. The method according to claim 1, wherein the defining the first XML document and the XML document based on one or more reusable content objects comprises defining the first XML document and the second XML document based on one or more fragments including compound objects and further comprising:

partitioning at least some of the content fragments into a plurality of groups such that if two compound fragments are constructed from at least one common changed fragment, then the compound fragments are placed in a same group; and publishing all fragments belonging to a same group together.

9. A computer-implemented method for creating two or more XML documents for publishing using an object dependency graph, the method comprising:

identifying one or more content objects comprising servables and fragments for constructing a web page based on input received from one or more of the following:
(i) information analysis and modeling;
(ii) target audience analysis;
(iii) target device analysis; and
(iv) workflow and role analysis;

creating one or more document templates that define the structure of the servables and of the fragments;

creating one or more stylesheets that determine the presentation and layout of the information in each servable for each target audience and each target device;

saving the document template as an XML file and saving meta information describing each of the servables and the fragments;

updating at least one object dependency graph that identifies content object dependency across a first XML document and a second XML document using one or more edges denoting relationships between one or more of the content objects so as to provide synchronization of the content objects across the first XML document and the second XML document building the first XML document so as to form a self-contained accumulation of the one or more content objects in accordance with the object dependency graph; and building the second XML document so as to form a self-contained accumulation of the one or more content objects in accordance with the object dependency graph; and in response to a value of the content objects being modified, a change is made across one or more output pages concurrently by automatically invoking an XSL transformation engine to transform the first XML document and the second XML document so as to produce the output pages.

10. The method according to claim 9, further comprising invoking an XSL transformation engine automatically in response to a value of the content objects being modified, to produce one or more viewable output pages.

11. The method according to claim 10, wherein the invoking an XSL transformation engine includes performing an edit to the viewable output pages.

12. The method according to claim 9, wherein the creating one or more document templates that define the structure of the servables and of the fragments includes:

receiving a search request from a user for searching metadata information that describes preexisting servables and fragments that can be used in creating the document template; and receiving a selection from a user to include preexisting servable and fragments in the document template based on the metadata searched.

13. The method according to claim 12, further comprising:

receiving a user request to create a new document template; and creating a blank form for holding one or more content objects.

14. The method according to claim 12, further comprising:

receiving a user request for editing a preexisting document template; and retrieving a preexisting document template according to the user request received.

15. The method according to claim 9, wherein the saving the document template as an XML file and saving meta information describing each of the servables and the fragments includes saving any attachments to the document.

16. The method according to claim 15, wherein the saving the document template includes saving any attachments to the document template selected from the group of attachments consisting of text files, video files, still images, stylesheets, and multimedia data.

17. A computer transportable medium containing programming instructions for execution on an information processing system to create two or more XML documents for publishing using an object dependency graph, the computer transportable medium comprising the programming instructions for:

defining a first XML document and a second XML document based upon one or more reusable content objects, whereby at least one of the content objects includes at least one object dependency graph that identifies content object dependency across the first XML document and the second XML document using one or more edges denoting relationships between one or more of the content objects so as to provide synchronization of the content objects across the first XML document and the second XML document;

building the first XML document so as to form a self-contained accumulation of the one or more content objects in accordance with the object dependency graph;

building the second XML document so as to form a self-contained accumulation of the one or more content objects in accordance with the object dependency graph; and in response to a value of the content objects being modified, a change is made across one or more output pages concurrently by automatically invoking an XSL transformation engine to transform the first XML document and the second XML document so as to produce the output pages.

18. The computer transportable medium according to claim 17, wherein the relationships are defined by at least one of:

a hypertext link from a first object to at least a second object; and at least one embedded content fragment common to two or more content objects.

19. The computer transportable medium according to claim 17, wherein the programming instruction of defining the first XML document and the second XML document based upon one or more reusable content objects includes defining the first XML document and the second XML document based upon one or more content objects, the objects comprising at least one of a fragment and a servable.

20. The computer transportable medium according to claim 19, wherein the programming instruction of defining the first XML document and the second XML document based upon one or more content objects, the objects comprising at least one content fragment which is a self-contained fragment.

21. The computer transportable medium according to claim 19, wherein the programming instruction of defining the first XML document and the second XML document based upon one or more content objects, the objects comprising at least one content fragment which is a compound fragment.

22. The computer transportable medium according to claim 19, wherein the programming instruction includes publishing the one or more viewable output pages.

23. The computer transportable medium according to claim 22, wherein the programming instruction of publishing includes at least one of:

publishing the one or more viewable output pages as Web pages; and publishing the one or more viewable output pages to other media or devices.

24. The computer transportable medium according to claim 17, wherein the programming instruction of defining the first XML document and the second XML document based on one or more reusable content objects comprises defining the first XML document and the second XML document based on one or more fragments including compound objects and further comprising:

partitioning at least some of the content fragments into a plurality of groups such that if two or more compound fragments are constructed from at least one common changed fragment, then the compound fragments are placed in a same group; and publishing all fragments belonging to a same group together.

* * * * *

UNITED STATES PATENT AND TRADEMARK OFFICE
CERTIFICATE OF CORRECTION

PATENT NO.        : 7,076,728 B2                                    Page 1 of 1
APPLICATION NO. : 09/747871
DATED             : July 11, 2006
INVENTOR(S)       : Peter E. Davis et al.

It is certified that error appears in the above-identified patent and that said Letters Patent is hereby corrected as shown below:

Column 25, Line 55, from "and the XML" to -- and the second SML --

Signed and Sealed this

Nineteenth Day of December, 2006

JON W. DUDAS
*Director of the United States Patent and Trademark Office*